US012585933B2

(12) United States Patent
Yoo et al.

(10) Patent No.: US 12,585,933 B2
(45) Date of Patent: Mar. 24, 2026

(54) TRANSFER LEARNING WITH AUGMENTED NEURAL NETWORKS

(71) Applicant: International Business Machines Corporation, Armonk, NY (US)

(72) Inventors: Chungkuk Yoo, Austin, TX (US); Bumsoo Kang, Daejeon (KR); Minsik Cho, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1173 days.

(21) Appl. No.: 16/561,896

(22) Filed: Sep. 5, 2019

(65) Prior Publication Data

US 2021/0073624 A1     Mar. 11, 2021

(51) Int. Cl.
*G06N 3/08*          (2023.01)
*G06N 3/04*          (2023.01)
*G06N 3/10*          (2006.01)

(52) U.S. Cl.
CPC ................. *G06N 3/08* (2013.01); *G06N 3/04* (2013.01); *G06N 3/10* (2013.01)

(58) Field of Classification Search
CPC .. G06N 3/08; G06N 3/04; G06N 3/10; G06N 3/0454; G06N 3/082; G06N 20/00
See application file for complete search history.

(56) References Cited

U.S. PATENT DOCUMENTS 10,452,959 B1 * 10/2019 Gautam ................... G06N 3/02
10,468,142 B1 * 11/2019 Abou Shousha ...... G16H 30/20

2018/0107926 A1    4/2018 Choi et al.
2018/0114114 A1 *  4/2018 Molchanov ............ G06N 3/084
2018/0150716 A1 *  5/2018 Farooqi ................ G06V 10/255
2020/0019825 A1 *  1/2020 Frei ........................... G06N 3/08
2020/0280717 A1 *  9/2020 Li ............................. G06N 3/04
2020/0285939 A1 *  9/2020 Baker .................... G06N 3/082

(Continued)

FOREIGN PATENT DOCUMENTS

CN          112446488 A      3/2021

OTHER PUBLICATIONS

Panboonyuen, Teerapong, et al. "Semantic segmentation on remotely sensed images using an enhanced global convolutional network with channel attention and domain specific transfer learning." Remote Sensing 11.1 Jan. 2019: 83. (Year: 2019).*

(Continued)

*Primary Examiner* — Li B. Zhen
*Assistant Examiner* — Henry Nguyen
(74) *Attorney, Agent, or Firm* — Garg Law Firm, PLLC; Rakesh Garg; Teddi Maranzano

(57)          ABSTRACT

A pretrained model is selected to operate in an augmented model configuration with a submodel. The submodel is trained using training data corresponding to a second domain, whereas the pretrained model is trained to operate on data of a first domain. The pretrained model is augmented, to form the augmented model configuration, with the submodel, by combining a first feature map being output from a layer in the pretrained model with a second feature map being output from a layer in the submodel. The combining forms a combined feature map. The combined feature map is input into a different layer in the submodel.

20 Claims, 17 Drawing Sheets

(56)                    References Cited

U.S. PATENT DOCUMENTS

2022/0172046 A1*    6/2022  Nishiyuki ............ G06N 3/0454
2022/0189170 A1*    6/2022  Zhu ...................... G06K 9/6227

OTHER PUBLICATIONS

Sarwar et al., "Incremental Learning in Deep Convolutional Neural Networks using Partial Network Sharing," arXiv preprint arXiv:1712. 02719, 2017.
Jacobs et al., "Towards Scalable Parallel Training of Deep Neural Networks," Proceedings of the Machine Learning on HPC Environments, ACM, 2017.
Misra et al., "Cross-stitch Networks for Multi-task Learning," Proceedings of the IEEE Conference on Computer Vision and Pattern Recognition, pp. 3994-4003, 2016.
Vaswani et al., Attention Is All You Need, 31st Conference on Neural Information Processing Systems (NIPS 2017), Long Beach, CA, USA.
Feichtenhofer et al., SlowFast Networks for Video Recognition, Apr. 18, 2019, Facebook AI Research (FAIR).
Application No. 202010767581.7, OA1, Dec. 15, 2023.
Application No. 202010767581.7, OA2, Apr. 20, 2024.
Application No. 202010767581.7, OA2 English Translation, Apr. 20, 2024.
Application No. 202010767581.7, Notice of Rejection, Jul. 6, 2024.

\* cited by examiner

100

*PRIOR-ART*

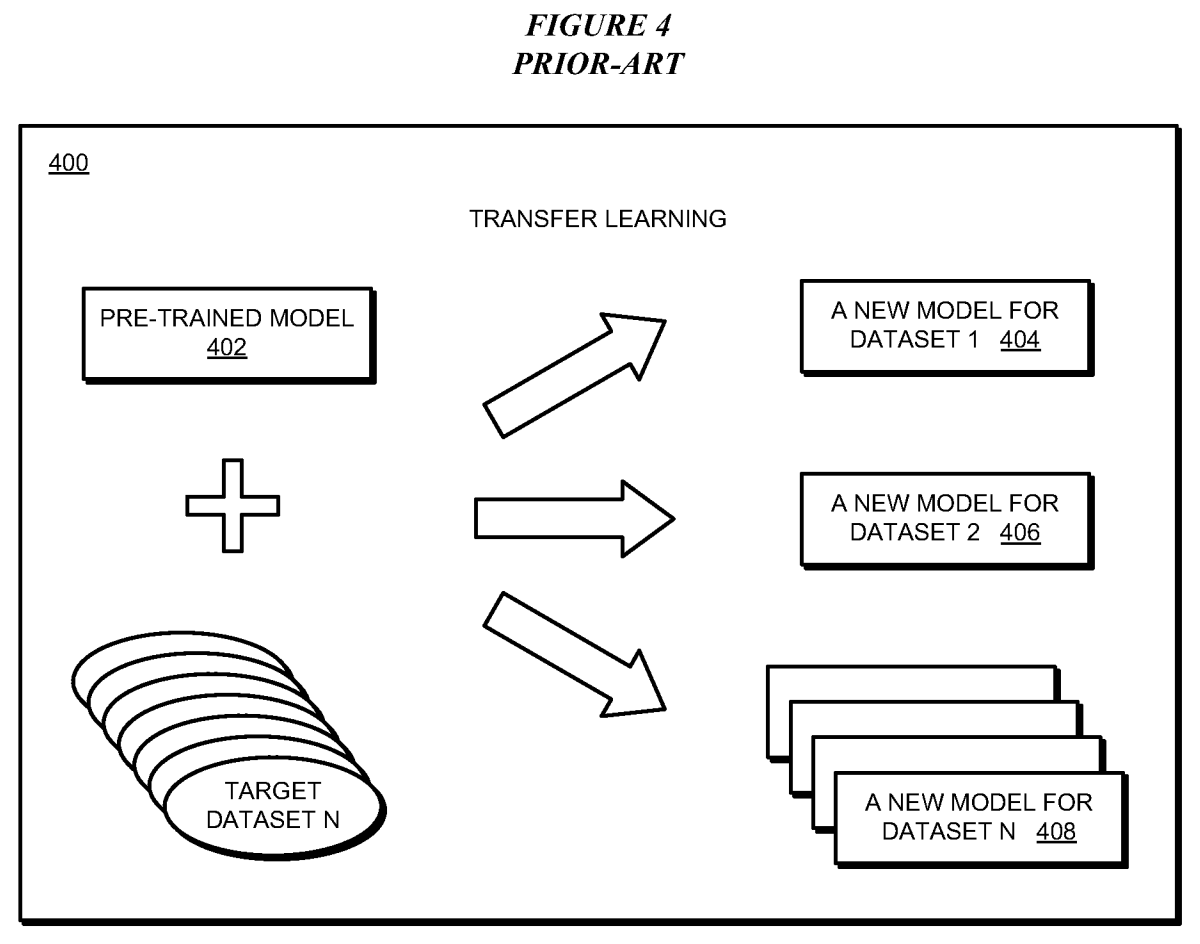

*FIGURE 4*
*PRIOR-ART*

400

TRANSFER LEARNING

PRE-TRAINED MODEL 402

+

TARGET DATASET N

A NEW MODEL FOR DATASET 1  404

A NEW MODEL FOR DATASET 2  406

A NEW MODEL FOR DATASET N  408

*FIGURE 5*

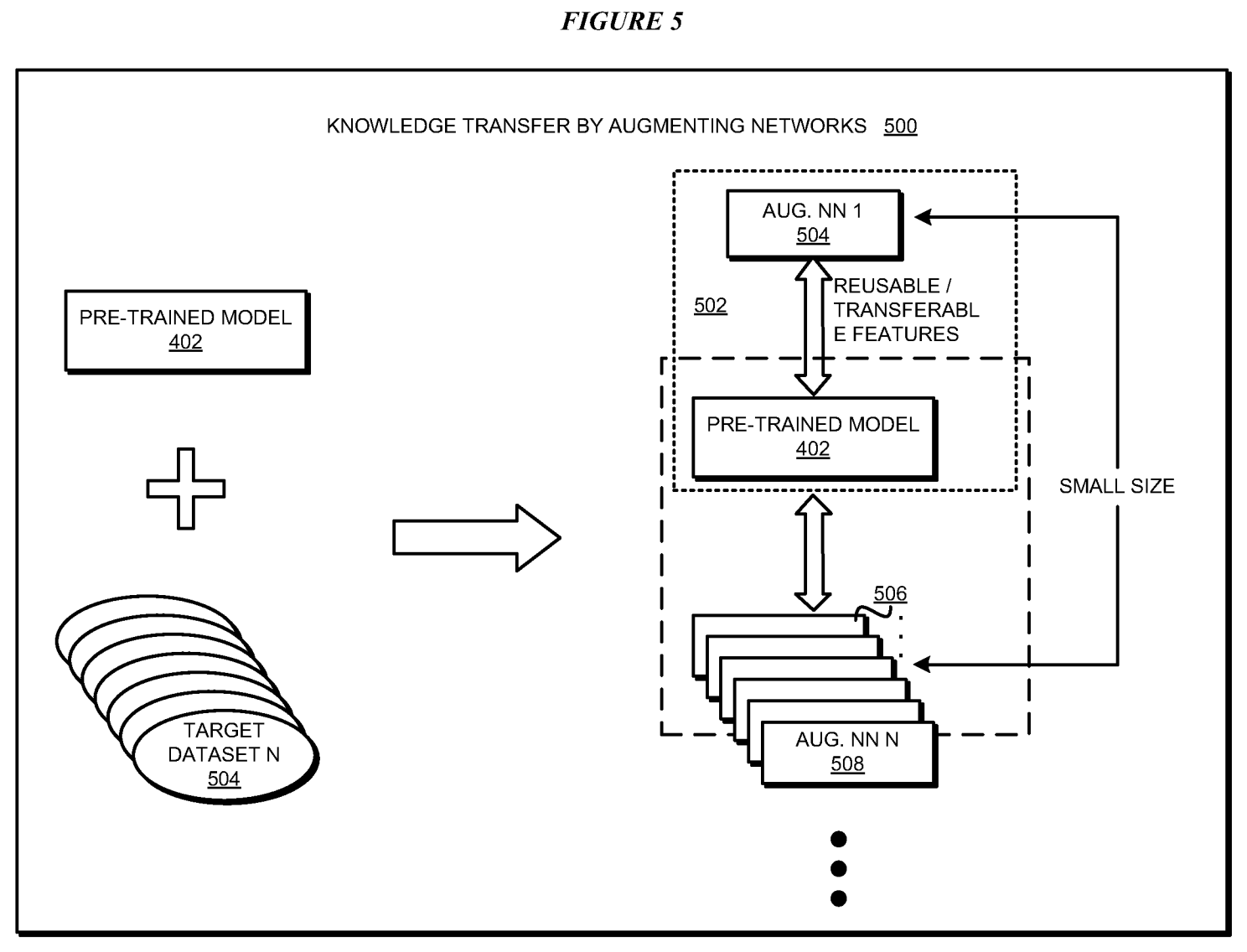

KNOWLEDGE TRANSFER BY AUGMENTING NETWORKS  500

PRE-TRAINED MODEL 402

TARGET DATASET N 504

AUG. NN 1 504

REUSABLE / TRANSFERABLE FEATURES

PRE-TRAINED MODEL 402

502

506

AUG. NN N 508

SMALL SIZE

Figure 7:
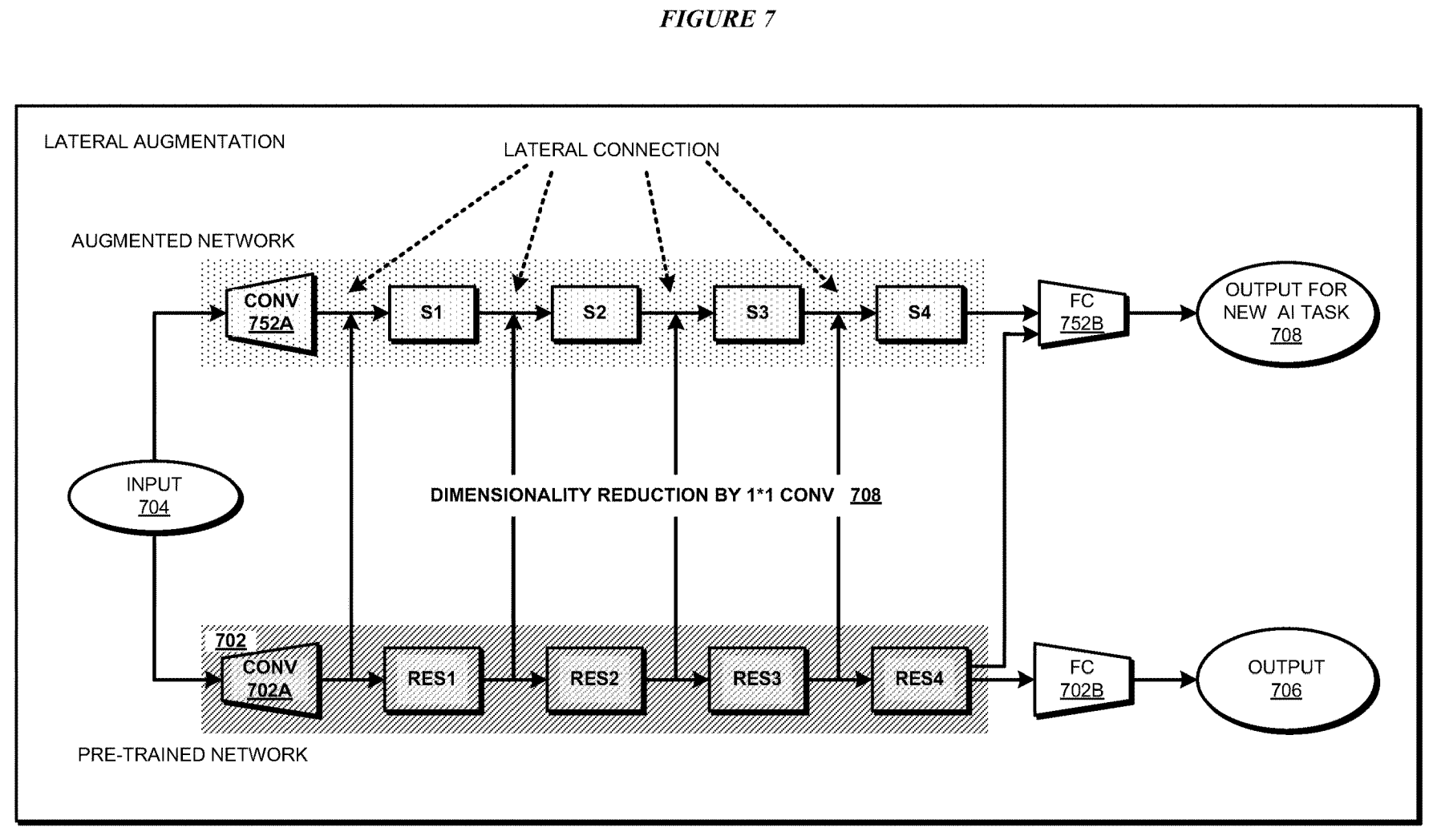

LATERAL AUGMENTATION

AUGMENTED NETWORK

LATERAL CONNECTION

OUTPUT FOR NEW AI TASK 708

FC 752B

S4

S3

S2

S1

CONV 752A

INPUT 704

DIMENSIONALITY REDUCTION BY 1*1 CONV 708

PRE-TRAINED NETWORK

OUTPUT 706

FC 702B

RES4

RES3

RES2

RES1

702

CONV 702A

*FIGURE 8*

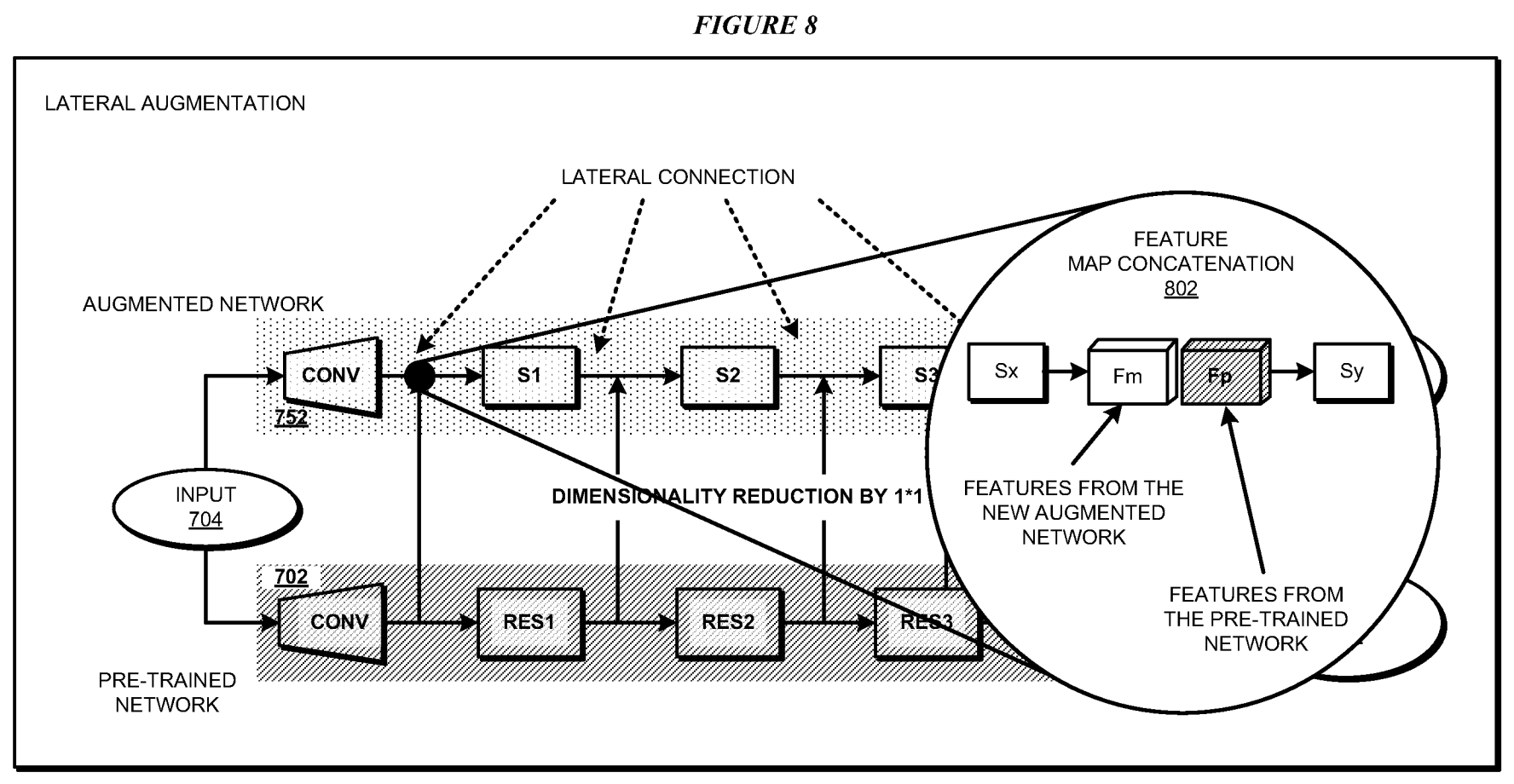

LATERAL AUGMENTATION

LATERAL CONNECTION

AUGMENTED NETWORK

PRE-TRAINED NETWORK

FEATURE MAP CONCATENATION
802

Sy

Fp

Fm

Sx

FEATURES FROM THE PRE-TRAINED NETWORK

FEATURES FROM THE NEW AUGMENTED NETWORK

S3

S2

S1

RES3

RES2

RES1

DIMENSIONALITY REDUCTION BY 1*1

CONV
752

CONV
702

INPUT
704

Figure 11:
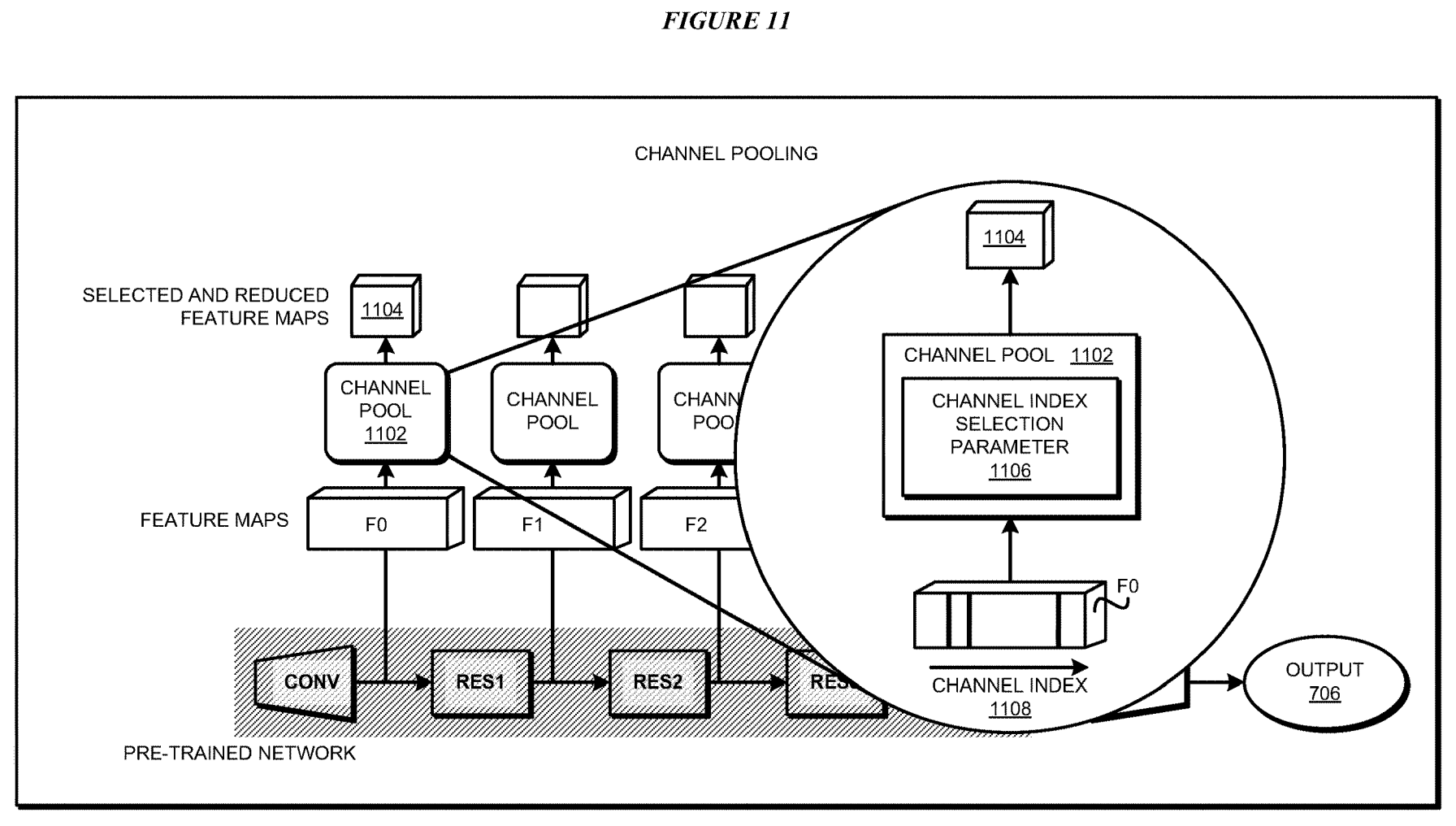

CHANNEL POOLING

CHANNEL POOL 1102

CHANNEL INDEX SELECTION PARAMETER 1106

F0

CHANNEL INDEX 1108

1104

OUTPUT 706

SELECTED AND REDUCED FEATURE MAPS

CHANNEL POOL

CHANNEL POOL

CHANNEL POOL 1102

1104

FEATURE MAPS

F0

F1

F2

CONV

RES1

RES2

RES3

PRE-TRAINED NETWORK

*FIGURE 12*

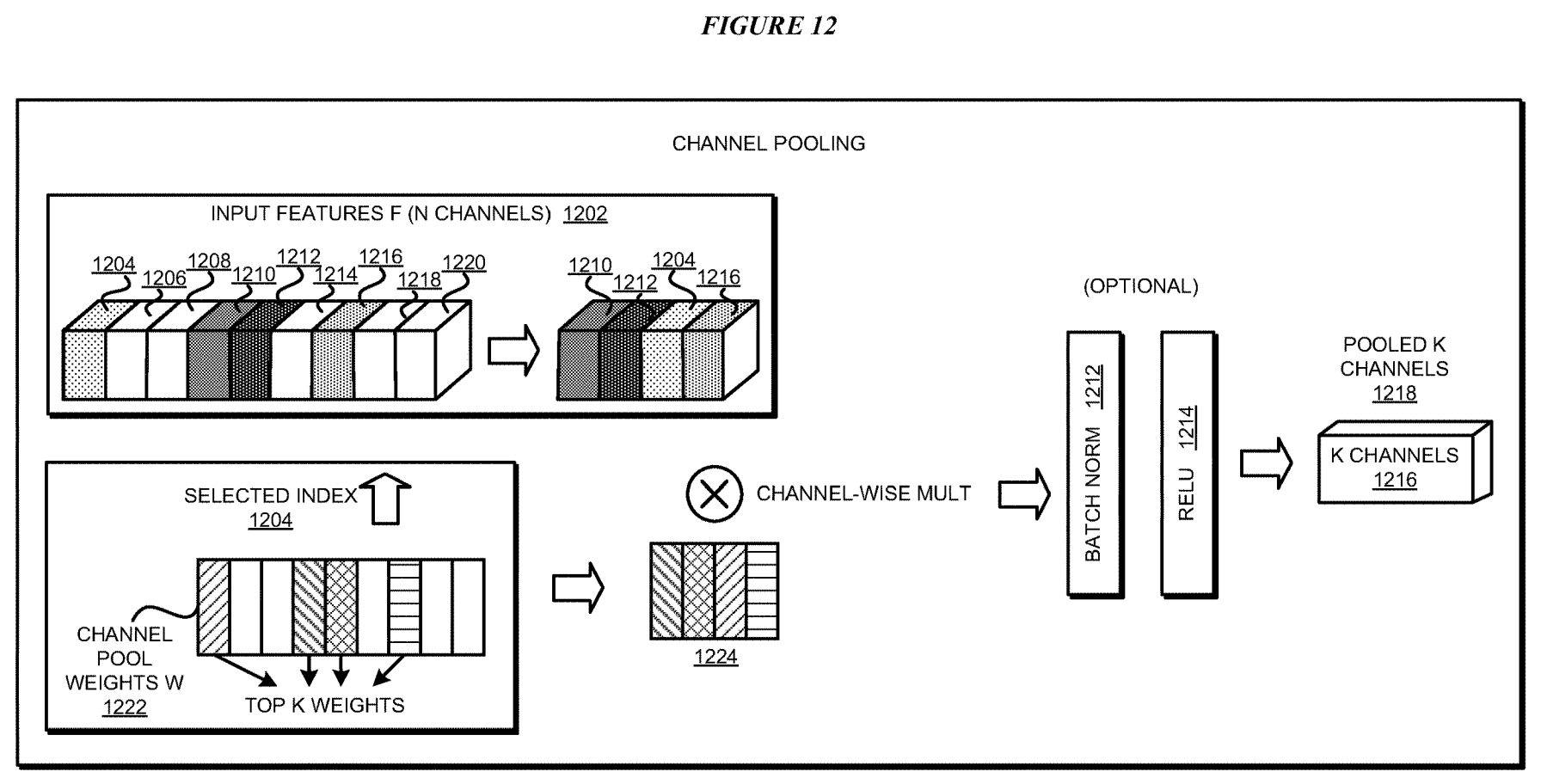

CHANNEL POOLING

POOLED K CHANNELS 1218

K CHANNELS 1216

(OPTIONAL)

RELU 1214

BATCH NORM 1212

CHANNEL-WISE MULT

INPUT FEATURES F (N CHANNELS) 1202

1204  1212
1210  1216
1210  1212  1216
1204

1220
1218
1216
1214
1212
1210
1208
1206
1204

1224

SELECTED INDEX 1204

TOP K WEIGHTS

CHANNEL POOL WEIGHTS W 1222

*FIGURE 13*

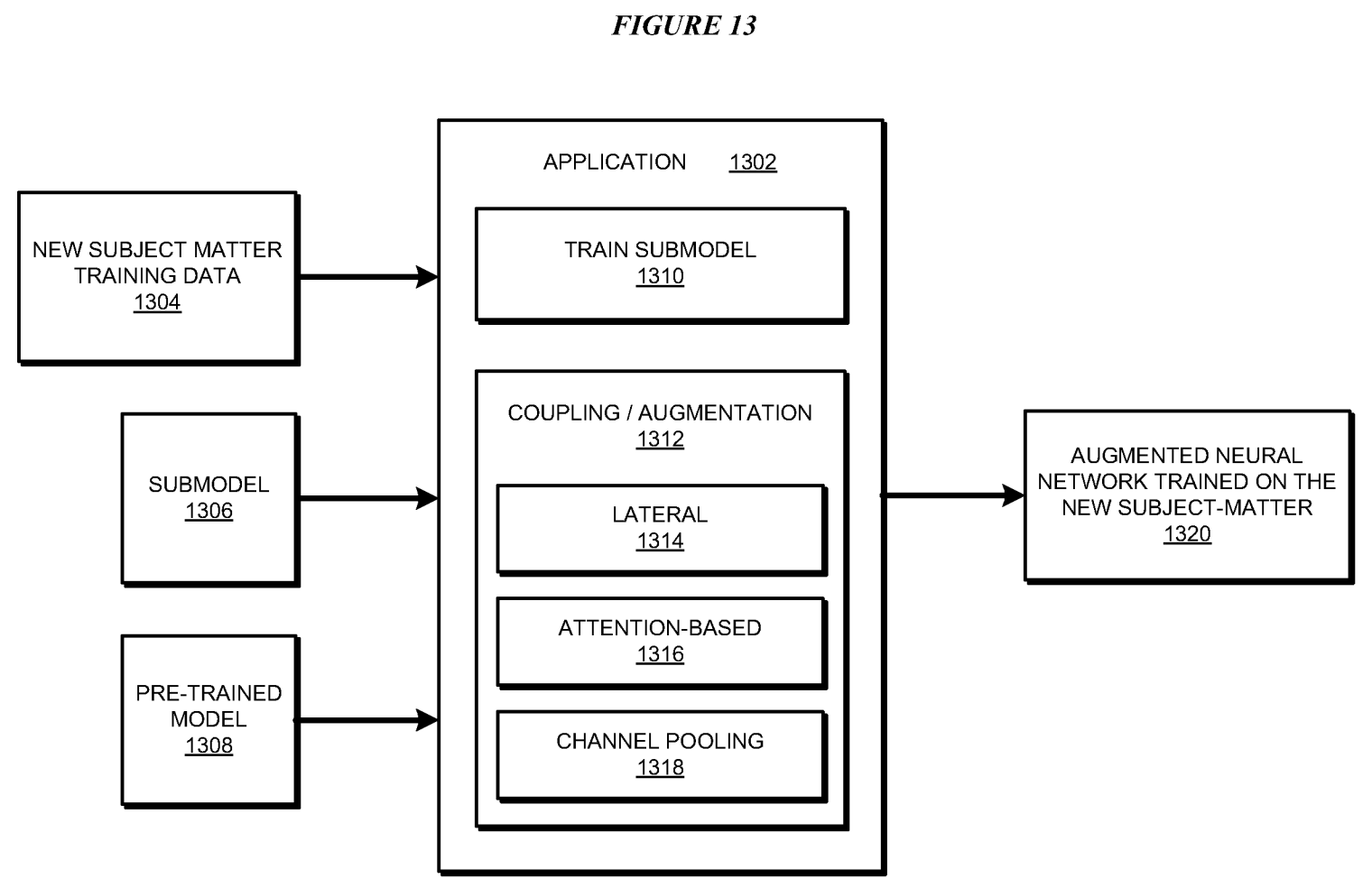

AUGMENTED NEURAL NETWORK TRAINED ON THE NEW SUBJECT-MATTER 1320

APPLICATION    1302

TRAIN SUBMODEL 1310

COUPLING / AUGMENTATION 1312

LATERAL 1314

ATTENTION-BASED 1316

CHANNEL POOLING 1318

NEW SUBJECT MATTER TRAINING DATA 1304

SUBMODEL 1306

PRE-TRAINED MODEL 1308

Figure 15:
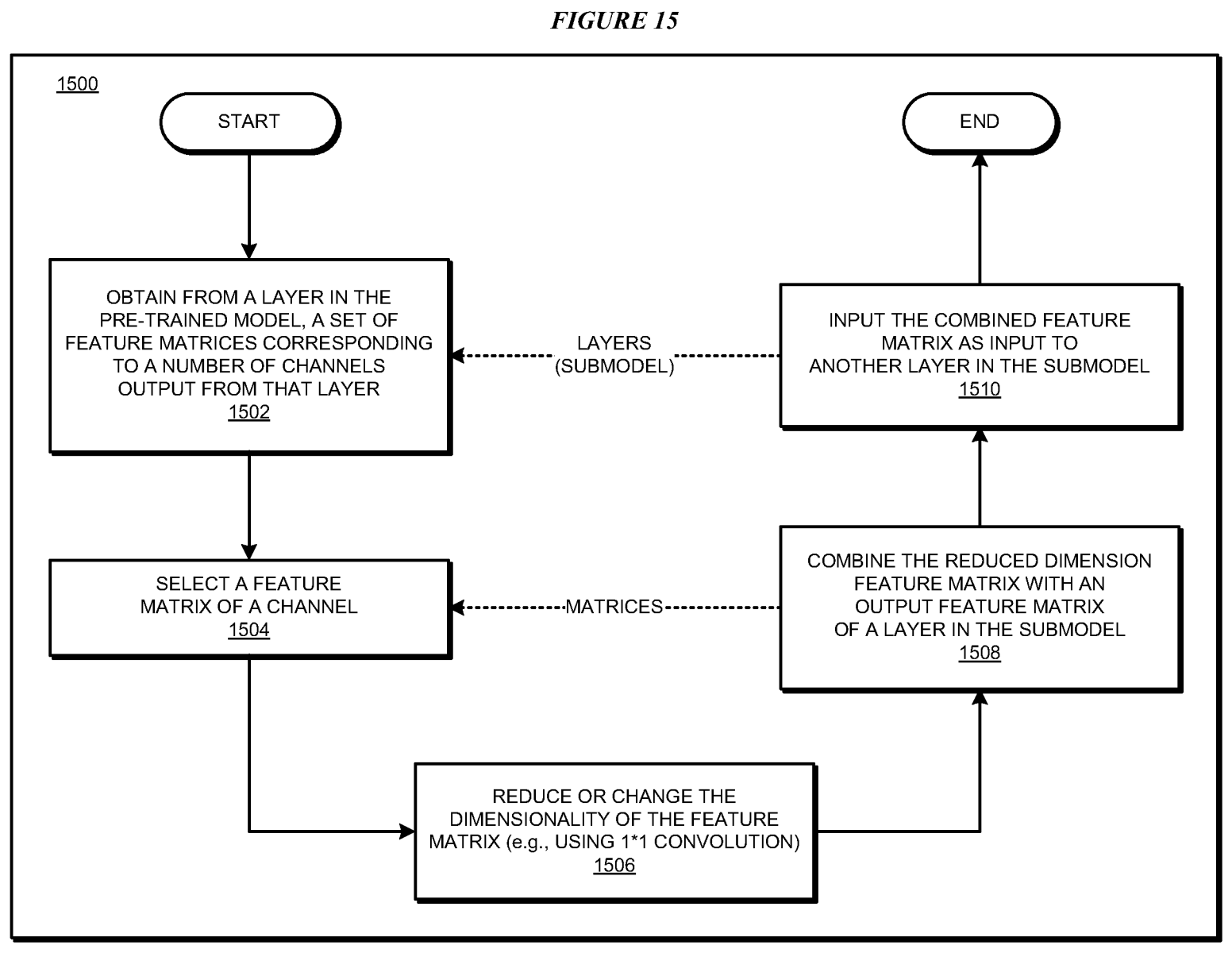

START

OBTAIN FROM A LAYER IN THE PRE-TRAINED MODEL, A SET OF FEATURE MATRICES CORRESPONDING TO A NUMBER OF CHANNELS OUTPUT FROM THAT LAYER
1502

SELECT A FEATURE MATRIX OF A CHANNEL
1504

REDUCE OR CHANGE THE DIMENSIONALITY OF THE FEATURE MATRIX (e.g., USING 1*1 CONVOLUTION)
1506

COMBINE THE REDUCED DIMENSION FEATURE MATRIX WITH AN OUTPUT FEATURE MATRIX OF A LAYER IN THE SUBMODEL
1508

INPUT THE COMBINED FEATURE MATRIX AS INPUT TO ANOTHER LAYER IN THE SUBMODEL
1510

END

LAYERS (SUBMODEL)

MATRICES

TRANSFER LEARNING WITH AUGMENTED NEURAL NETWORKS

TECHNICAL FIELD

The present invention relates generally to a method, system, and computer program product for training neural networks. More particularly, the present invention relates to a method, system, and computer program product for transfer learning with augmented neural networks.

BACKGROUND

An Artificial Neural Network (ANN)—also referred to simply as a neural network (NN)—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

ANNs are used for a variety of data analysis purposes, including but not limited to natural language processing (NLP), image analysis, classification in various types of data such as numeric, textual, speech, image, or even noise, and many other applications.

A feedforward neural network is an artificial neural network where connections between the units do not form a cycle. In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Recurrent neural networks (RNN) are a type of artificial neural network designed to recognize patterns in sequences of data, such as text, genomes, handwriting, the spoken word, or numerical times series data emanating from sensors, stock markets and government agencies. RANNs use recurrent connections (going in the opposite direction that the "normal" signal flow) which form cycles in the network's topology.

A deep neural network (DNN) is an artificial neural network with multiple hidden layers of units between the input and output layers. Similar to shallow ANNs, DANNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network.

Generally, in an ANN, a node is connected with one or more other nodes via weighted connections in a layer of the ANN. A layer is connected to another layer in the ANN by coupling one layer's output to another layer's input.

A feature is an artifact or value identified as significant in a layer of an ANN. A layer of an ANN produces an output on one or more output channels (channels). A layer in an ANN outputs a feature map. A feature map comprises a set of feature matrices for each channel over a given number of channels. A feature matrix comprises a set of features, which is output as a data matrix. A feature matrix includes biases associated with the corresponding features represented in the matrix. A weight or bias is a value that is associated with a subject value to indicate a significance of the subject value. For example, a relatively lower weighted connection is less important than a relatively higher weighted connection, a feature with a relatively higher bias is more significant than another feature with a relatively lower bias.

A layer accepts as input a feature map provided by a previous layer as output. The accepting layer can be configured such that the layer accepts the feature map output of the providing layer as-is. Alternatively, the accepting layer can be configured such that the layer accepts the feature map output of the providing layer after some processing, such as bias changes, feature reduction, or other operations applied to the feature map before inputting to the accepting layer.

An ANN has to be trained before the ANN can be used for a useful purpose. A trained ANN is also referred to herein as a 'model' unless expressly distinguished where used.

An ANN training subjects an ANN to training data of a type and subject-matter in which the trained model will be expected to operate. The training includes adjusting the weights of the internode connections, weighting of interlayer connections, feature matrix configuration for ingestion at a layer, feature map configuration at the output of a layer, feature weighting or bias in a feature matrix, channel biasing at the input/output of layers, and many other operations.

Training an ANN is computationally expensive. An ANN that is trained with a larger amount of training data can be, but not necessarily be, more accurate than an ANN trained with a smaller amount of data in otherwise identical conditions. The computational expense and the time consumed in training an ANN is a factor not only of the size of the training data but also the size of the ANN. A typical ANN can include tens of thousands of nodes in hundreds of layers, tuning which consumes significant time and computational resources.

SUMMARY

The illustrative embodiments provide a method, system, and computer program product. An embodiment selects a pretrained model to operate in an augmented model configuration with a submodel. The embodiment trains, using a processor and a memory, the submodel using training data corresponding to a second domain, wherein the pretrained model is trained to operate on data of a first domain. The embodiment augments, to form the augmented model configuration, the pretrained model with the submodel. The augmenting includes combining, to form a combined feature map, a first feature map being output from a layer in the pretrained model with a second feature map being output from a layer in the submodel, and inputting the combined feature map into a different layer in the submodel.

An embodiment selects a pretrained model to operate in an augmented model configuration with a submodel. The embodiment training, using a processor and a memory, the submodel using training data corresponding to a second domain, wherein the pretrained model is trained to operate on data of a first domain. The embodiment augments, to form the augmented model configuration, the pretrained model with the submodel. The augmenting includes adjusting an attention value of a channel in a first feature map being output from a layer in the pretrained model, wherein the adjusting causes a first feature matrix of the channel in the first feature map to have a greater weight relative to a second feature matrix of a different channel in the first feature map. The augmenting further includes combining, to form a combined feature map, a first feature matrix of the channel in the first feature map with a second feature map being output from a layer in the submodel; and inputting the combined feature map into a different layer in the submodel.

An embodiment selects a pretrained model to operate in an augmented model configuration with a submodel. The embodiment trains, using a processor and a memory, the submodel using training data corresponding to a second domain, wherein the pretrained model is trained to operate on data of a first domain. The embodiment augments, to form the augmented model configuration, the pretrained model with the submodel. The augmenting includes applying a channel selection parameter to a first channel in a first feature map being output from a layer in the pretrained model, wherein the applying causes a first feature matrix of the first channel in the first feature map to have a greater weight relative to a second feature matrix of a different channel in the first feature map; rearranging a subset of channels from the output of the layer in the pretrained model, the subset including those channels whose channel selection parameters cause those channels to have a greater than a threshold weight, the rearranging further applying a second weight vector to the subset of channels according to a relevance criterion, the subset including the first channel as a highest weighted channel; combining, to form a combined feature map, a first feature matrix of the first channel in the first feature map with a second feature map being output from a layer in the submodel; and inputting the combined feature map into a different layer in the submodel.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 illustrates the undesirability of the prior-art method of transfer training;

FIG. 5 illustrates a block diagram of an augmentation methodology that can improve transfer training of ANNs in accordance with an illustrative embodiment;

FIG. 6 depicts a block diagram on a conceptual augmented ANN in accordance with an illustrative embodiment;

FIG. 7 depicts a block diagram of a lateral augmentation process in accordance with an illustrative embodiment;

FIG. 8 depicts a block diagram of an example manner of combining features for input to a submodel layer in accordance with an illustrative embodiment;

FIG. 10 depicts a block diagram of an example manner of combining features for input to a submodel layer in accordance with an illustrative embodiment;

FIG. 11 depicts a block diagram of channel pooling process in accordance with an illustrative embodiment;

FIG. 12 depicts a block diagram of an example manner of channel pooling in accordance with an illustrative embodiment;

FIG. 13 depicts a block diagram of an example application for transfer learning with augmented neural networks in accordance with an illustrative embodiment;

FIG. 14 depicts a flowchart of an example process for transfer learning with augmented neural networks in accordance with an illustrative embodiment;

FIG. 15 depicts a flowchart of an example process for lateral augmentation in accordance with an illustrative embodiment;

FIG. 16 depicts a flowchart of an example process for an attention-based augmentation in accordance with an illustrative embodiment; and FIG. 17 depicts a flowchart of an example process for channel pooling in accordance with an illustrative embodiment.

DETAILED DESCRIPTION

Figure 1:
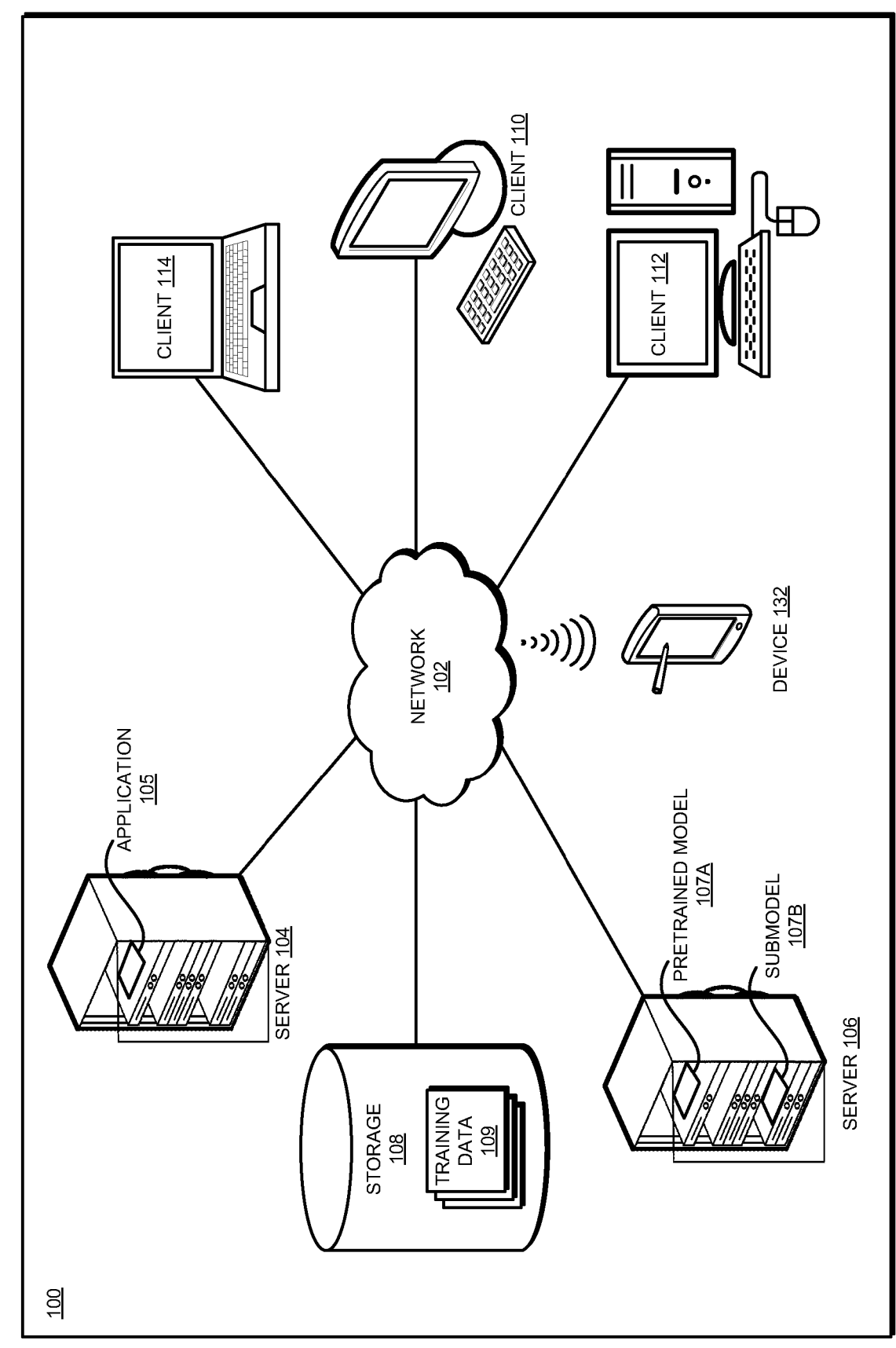
FIG. 1 depicts a block diagram of a network of data processing systems in which illustrative embodiments may be implemented.

Neural networks, training ANNs, and machine learning are all well recognized technological fields of endeavor. The present state of the technology in these fields of endeavor has certain drawbacks and limitations. The operations and/or configurations of the illustrative embodiments impart additional or new capabilities to improve the existing technology in the technological field of endeavor of neural networks, training ANNs, and machine learning.

Transfer learning is a method of retraining a pretrained model of ruse with a different dataset. A dataset is a type of data pertaining to a subject-matter, which the retrained model will be expected to process when deployed. The illustrative embodiments recognize that presently available transfer learning methodology subjects a pretrained model to retraining in a manner described above. Given a target dataset, a pretrained model is simply retrained as a whole with the training data conforming to the target dataset. The resultant retrained model then operates relative to the target dataset when deployed.

The illustrative embodiments recognize that presently, when a previously trained model has to be trained on a different subject-matter, whether by transfer learning or new learning, the underlying ANN has to be retrained as a whole. Retraining a model on a different subject-matter consumes comparable time and resources as the initial training of the ANN. The illustrative embodiments recognize that training an untrained ANN as a whole from scratch, or retraining a previously trained ANN as a whole consume an undesirable amount of training time and computational resources.

The present state of the technological field of endeavor of transfer learning presently does not include a mechanism, other than retraining the entire ANN, to compress the training time and resource requirements. A need exists for perform transfer learning on pretrained models in less time and with less computing resources as compared to training or retraining the entire ANN. A need exists that such the ANN function be achieved on a new target dataset without modifying the existing training of the pretrained model for a different target dataset.

The illustrative embodiments recognize that the presently available tools or solutions do not address these needs/problems or provide adequate solutions for these needs/problems. The illustrative embodiments used to describe the invention generally address and solve the above-described problems and other related problems by transfer learning with augmented neural networks.

An embodiment can be implemented as a combination of certain hardware components and a software application. An implementation of an embodiment, or one or more components thereof, can be configured as a modification of an existing machine learning system, with a companion software application executing in some combination of (i) the machine learning system itself, (ii) a data processing system communicating with the machine learning system over short-range radio or a local area network (LAN), and (iii) a data processing system communicating with the machine learning system over a wide area network (WAN).

An embodiment augments a pretrained model—a pretrained ANN that its trained on some dataset, with a submodel—a different model that is trained on a target dataset. The augmentation produces an augmented model. The target dataset is the desired dataset for the augmented model and is different from the dataset on which the pretrained model has been previously trained. The augmented model can be understood as a combined model in which some layers of the pretrained model are coupled with some layers of the submodel via input/output feature maps.

In some embodiments, the submodel is smaller than the model, such that the submodel includes a smaller number of nodes as compared to the pretrained model, a smaller number of layers as compared to the pretrained model, a smaller number of model parameters, or some combination thereof. Generally, within the scope of the illustrative embodiments, the pretrained model and submodel can of any size relative to one another, including the submodel being of a smaller, equal, or larger size than the pretrained model. Within the scope of the illustrative embodiments, all or some layers of the pretrained model can be coupled with a layer in the submodel. Within the scope of the illustrative embodiments, all or some layers of submodel can be coupled with a layer in the pretrained model. Different layers of pretrained model can have 1:1, 1:n, or n:1 relationship with the different layers of the submodel within the contemplated scope.

The training of the submodel on the target can be performed in any suitable manner without departing the scope of the illustrative embodiments. An embodiment selects, from a repository of pretrained models that have been trained on various datasets, a pretrained model whose corresponding dataset is related to the target dataset according to a relationship criterion by at least a threshold degree. Augmenting the submodel with the pretrained model in a manner described herein, an embodiment achieves knowledge transfer about the target dataset to the augmented model.

One embodiment performs lateral augmentation to construct the augmented model. In lateral augmentation, the embodiment combines an output of a layer in the pretrained model (PL) with an output of a layer in the submodel (SL) to create an input to a next layer in the submodel (SNL). Particularly, an embodiment joins a feature map of the PL with the feature map of the SL to construct the feature map input for SNL. One example of a joining method includes, but is not limited to, concatenating the feature maps of PL and SL to form the SNL input. Those of ordinary skill in the art will be able to combine two feature maps in other manner, without being limited to concatenation, and such other methods of joining are contemplated within the scope of the illustrative embodiments. For example, even the concatenation may be limited to only some features of the PL, some features of the SL, or both, such that not all features of the PL (or SL) are concatenated with all features of the SL (or PL) to form the input to SNL.

Another embodiment performs a channel pooling method of augmentation to construct the augmented model. Channel pooling is another example manner of performing a lateral augmentation where, to form an input to the SNL, the embodiment performs one or more of the following operations in a desired combination—(i) select only certain channels from the output of PL, (ii) extract some but not all features from a selected channel, (iii) adjust the weights of an extracted feature, (iv) select some but not all of the weight-adjusted features, and (v) combining a result of any combination of (i)-(iv) with an output of SL. Furthermore, before combining a result of any combination of (i)-(iv) as applied to an output of a PL, another embodiment further performs (i)-(iv) relative to an output of SL. In one example operation configured in this manner, an embodiment combines only selected weight-adjusted features of certain channels of PL with certain selected weight-adjusted features of certain channels of SL, to form the input feature map for SNL.

For example, suppose that PL outputs on 10 channels, each channel producing a 10 features with their corresponding feature matrix. Further assume that PL output already assigns some weights to certain channels, for example, channel 1 has weight 10, channel 2 has weight 1, channel 3 has weight 9, channel 4 has weight 3, channel 5 has weight 1, channel 6 has weight 8, channel 7 has weight 3, channel 8 has weight 6, channel 9 has weight 7, channel 10 has weight 3. The embodiment selects only those channels that are weighted 5 or higher, thus selecting the features output on channels 1, 3, 6, 8, and 9. Now, suppose that certain features are weighted more given the particular target dataset. Assume that feature type A has weight 0.8, feature type B has weight 0.9, feature type C has weight 0.75, feature type D has weight 0.8, with other feature types having lower weights in the embodiment. These weights when applied to the features in the outputs of channels 1, 3, 6, 8, and 9 produce weight-adjusted features p, q, r, and z from channels 1, 3, 6, 8, 9 from a certain PL, say PL1. Based on a similar channel pooling logic, which applies the same or different channel selection, feature selection, feature weighting, or some combination thereof to the outputs of different PLs, the embodiment produces from another PL, say PL2, weight-adjusted features e, g, r, and t from channels 4, 5, and 7 from PL2.

Another embodiment performs attention-based augmentation to construct the augmented model. In attention-based augmentation, the embodiment applies an attention parameter to an output channel of a PL. specifically, as in lateral augmentation or channel pooling augmentation, the embodiment combines some or all features of some or all channels from the PL with some or all features of some or all channels from the SL. The embodiment then applies an attention parameter—which operates in a manner of a weight or bias but for all features output from a specific channel. The embodiment configures one or more channel attention parameters to be applied to one or more channels in the combination of PL and SL outputs. The channel attention operates to raise the weight of the features on the channels which receive attention in this manner. A higher attention parameter floats the features on that channel higher than the features of other channels, and vice versa. In this manner, only some channels of the PL, some channels of the SL, or both, receive higher than a threshold attention parameter values such that not all channels of the PL (or SL) are elevated (or suppressed) to form the input to SNL.

The manner of transfer learning with augmented neural networks described herein is unavailable in the presently available methods in the technological field of endeavor pertaining to transfer learning in ANNs. A method of an embodiment described herein, when implemented to execute on a device or data processing system, comprises substantial advancement of the functionality of that device or data processing system in speeding up the transfer learning of pretrained models for new target datasets.

The illustrative embodiments are described with respect to certain types of data, features, matrices, maps, weights, channels, layers, nodes, ANNs, values, parameters, computations, filtering, concatenations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
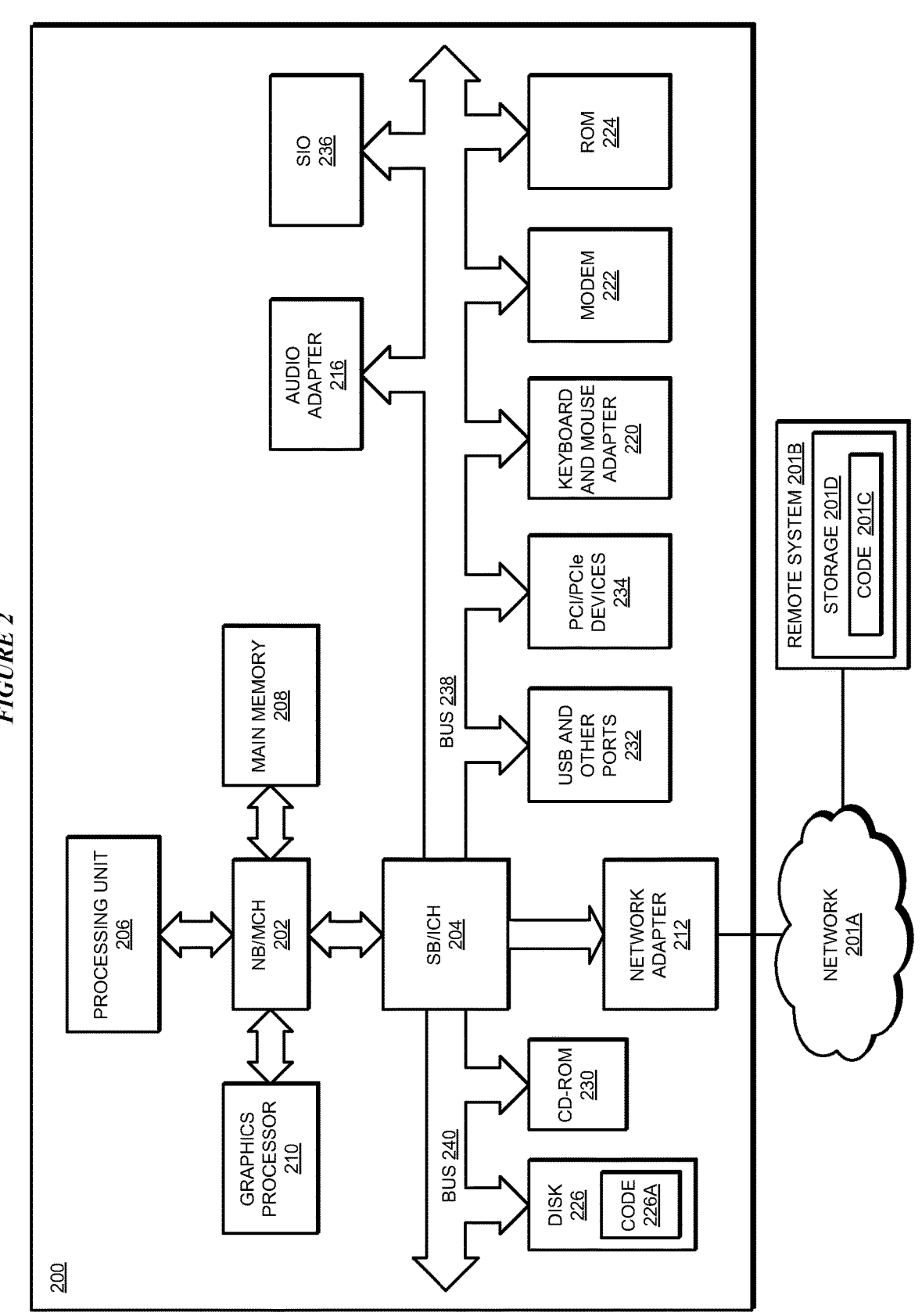
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. Application 111 implements a locally usable function (local) or a natively usable function (native) of an embodiment described herein. Application 134 implements a natively usable function (native) of an embodiment described herein. Applications 105 and 111 can be used in a combination, applications 105 and 134 can be used in another combination, and applications 105, 111, and 134 can be used in another combination, to distribute certain functions of an embodiment. Application 105 generates all or part of an embodiment described herein. Pretrained model is an already trained ANN as described herein. Submodel is another ANN as described herein. Application 105 uses training data 109, which is an example of a training dataset configured corresponding to a target dataset—to train submodel 107B for the target dataset. Application 105 augments submodel 107B with pretrained model 107A to form an augmented model as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
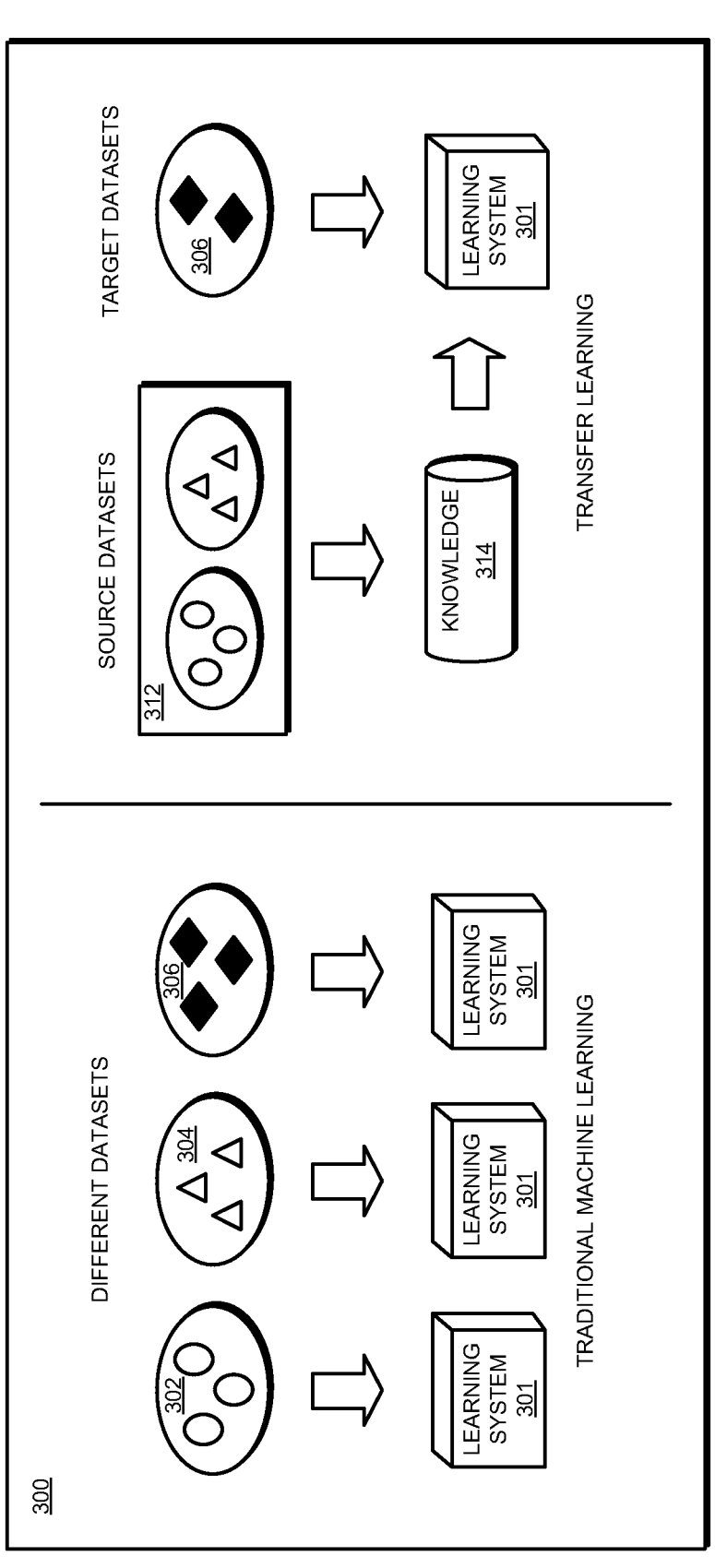
FIG. 3 depicts a block diagram of a prior-art method of ANN training that can be improved with an illustrative embodiment.

With reference to FIG. 3, this figure depicts a block diagram of a prior-art method of ANN training that can be improved with an illustrative embodiment. Configuration 300 depicts the traditional machine learning method and the prior-art transfer learning method.

In the traditional machine learning method, different training datasets are used in machine learning system 301 to configure or train an ANN for the subject-matter domain of the particular training dataset. For example, if block 302 represents the training dataset for classifying one type of widgets (e.g., classification of plant features), machine learning system 301 performs the training on an entirety of a given ANN (not shown) to produce a trained ANN that can identify and classify widgets that qualify as features of an plant.

As another example, if block 304 represents the training dataset for classifying another type of widgets (e.g., classification of animal species), machine learning system 301 performs the training on an entirety of a given ANN (not shown) to produce a trained ANN that can identify and classify widgets that qualify as animals of certain species.

As another example, if block 306 represents the training dataset for classifying another type of widgets (e.g., classification of chemical properties), machine learning system 301 performs the training on an entirety of a given ANN (not shown) to produce a trained ANN that can identify and classify widgets that qualify as properties of certain chemical compounds.

Of course, more than one dataset can be used to train an ANN on multiple domains. For example, a combined dataset 312, formed from training dataset for classifying one type of widgets (e.g., classification of plant features as in dataset 302) with training dataset for classifying another type of widgets (e.g., classification of animal species as in dataset 304). The resulting pretrained model (not shown) then contains knowledge 314 to perform the classification of either plants or animal. Presently available transfer learning methodology applies training dataset for classifying another type of widgets (e.g., classification of chemical properties) to the existing knowledge 314 of the pretrained model by training the entire pretrained model with existing knowledge 314 all over again on dataset 306. As recognized by the illustrative embodiments herein, this method of transfer training is computationally expensive and time consuming.

With reference to FIG. 4, this figure illustrates the undesirability of the prior-art method of transfer training. As depicted in configuration 400, prior-art transfer training using pretrained model 402 with target dataset 1 would produce new model 404 for target dataset 1, pretrained model 402 with target dataset 2 would produce new model 406 for target dataset 2, . . . pretrained model 402 with target dataset N would produce new model 408 for target dataset N. Each prior-art transfer training session would suffer from the undesirability described herein. Furthermore, when a single model is to be trained on multiple target datasets 1-N, the transfer training time and computing resources are still proportional to the numbers and sizes of target datasets.

With reference to FIG. 5, this figure illustrates a block diagram of an augmentation methodology that can improve transfer training of ANNs in accordance with an illustrative embodiment. As depicted in configuration 500, transfer training according to an embodiment uses pretrained model 402 with target datasets 1-N to produce augmented model 502. An embodiment trains submodel 504 for target dataset 1 and augments submodel 504 with pretrained model 402 to produce augmented model 502. Different submodels 504, 506 . . . 508 can similarly be configured by the embodiment for different target datasets 1-N.

An embodiment can be configured according to the requirements of a specific implementation, i.e., depending on the number of different target datasets 1-N augmented model 502 is expected to operate on collectively, to augment pretrained model 402 with one or more of submodels 502-508 as shown. Resulting augmented model 502 is trained not only with knowledge contained in pretrained model 402 but also in the subject-matter of selected target datasets 1-N.

In one embodiment, but not necessarily in all cases, a submodel, e.g., submodel 504 can be smaller than pretrained model 402, as described herein. Because the training of pretrained model 402 remains undisturbed, and (preferably smaller) submodels are trained on the specific target datasets, the transfer training time and computing resources to produce augmented model 502 are significantly reduced as compared to the same metrics in a prior-art transfer training or traditional machine learning method for the same numbers and sizes of target datasets.

Figure 6:
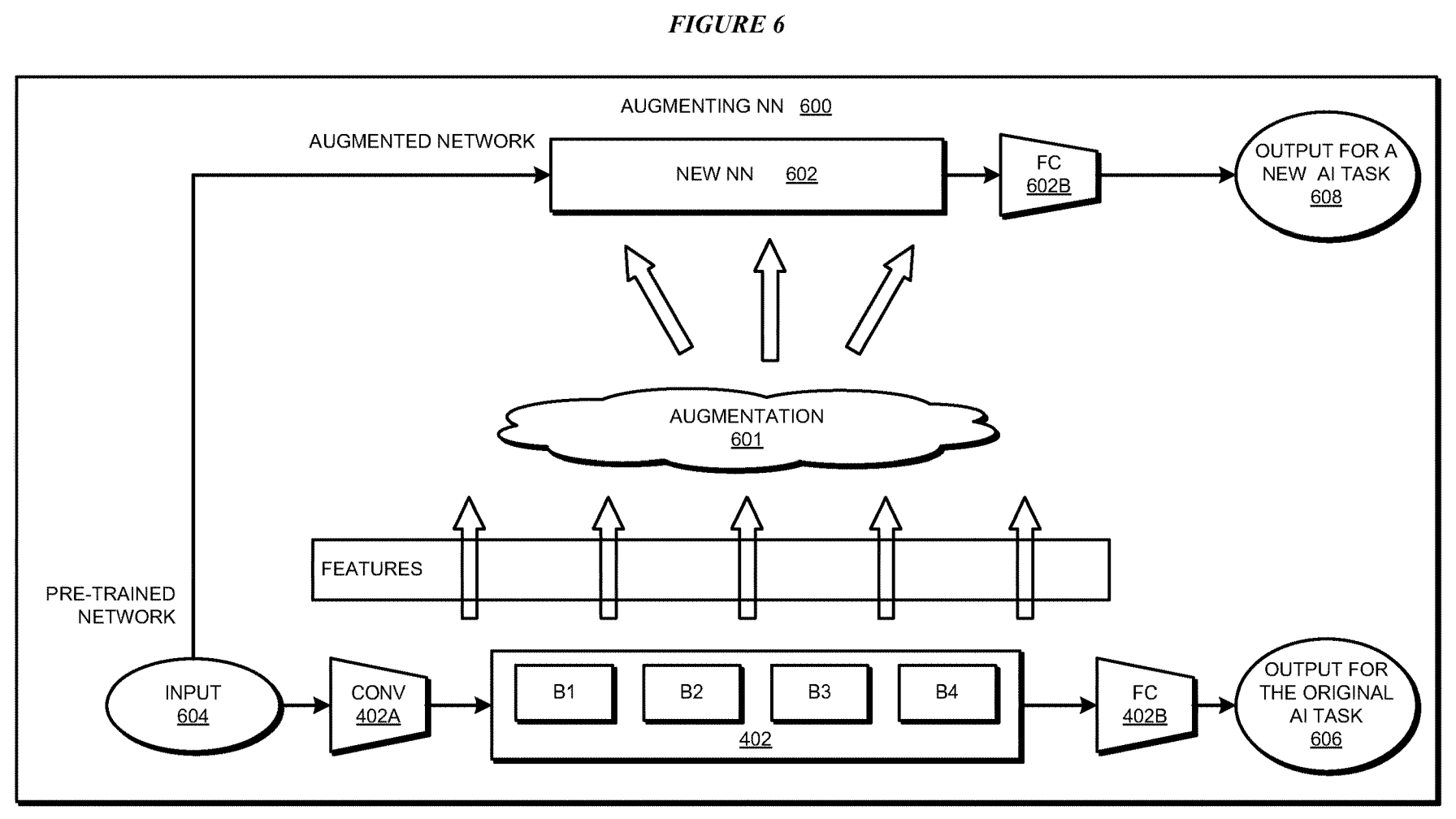

With reference to FIG. 6, this figure depicts a block diagram on a conceptual augmented ANN in accordance with an illustrative embodiment. The augmented model of configuration 600 shows pretrained model 402 as used in FIG. 5. New ANN 602 is an example of any of submodels 504-508 in FIG. 5. Any augmentation method 601 described herein is usable to augment submodel 602 with pretrained model 402 to form an augmented model as described herein.

Pretrained model 402 may include an initial convolution stage 402A, a final convolution stage 402B, or both depending on the particular implementation. Similarly, submodel 602 may, but need not necessarily include an initial convolution stage (not shown), final convolution stage 602B, or both depending on the particular implementation of submodel 602. The depiction of stages 402A, 402B, and 602B are not intended to be limiting on the illustrative embodiments.

Pretrained model 402 retains the original training e.g., knowledge 314 in FIG. 3. When receiving input 604 which corresponds to the previous training of pretrained model 402, pretrained model 402 produces output 606. When input 606 includes data corresponding to the target dataset of submodel 602, the augmented model formed from pretrained model 402 and submodel 602 produces output 608.

In a manner described herein, augmentation 601 augments submodel 602 with pretrained model 402 by processing and combining one or more features output from one or more layers (some combination of convolution layer 402A, B 1, B2, B3, B4 . . . Bn, and even final convolution layer 402B) with one or more features from a layer in submodel 602 to build an input feature map for another layer in submodel 602.

With reference to FIG. 7, this figure depicts a block diagram of a lateral augmentation process in accordance with an illustrative embodiment. Pretrained model 702 including initial stage 702A and final stage 702B are examples of pretrained model 402, stage 402A, and stage 402B, respectively, in FIG. 6. Submodel 752 including initial stage 752A and final stage 752B are examples of submodel 602, initial convolution stage (not shown), and final stage 602B, respectively, in FIG. 6. Layers Res1, Res2, Res3 . . . Res4 are some example layers (PL) in pretrained model 702. Layers S1, S2, S3 . . . S4 are some example layers (SL and SNL) in submodel 752. Input 704 and outputs 706 and 708 are examples of input 604 and outputs 606 and 608, respectively, as described with respect to FIG. 6.

According to the lateral augmentation methodology described earlier, an embodiment combines one or more features from one or more channels output from a layer (PL) in pretrained model 702 with one or more features from one or more channels output from a layer (SL) in submodel 752 to form an input to a next layer (SNL) in submodel 752. For example, stage 702A forms a PL and contributes features F0, which when combined as described herein with the features output from stage 752A (SL), form an input to layer S1 (SNL). Similarly, stage Res1 forms a PL and contributes features F1, which when combined as described herein with the features output from stage Si (SL), form an input to layer S2 (SNL). Features F3, F4, and F5 are combines with outputs of submodel stages in a similar manner for lateral augmentation.

In one embodiment, a dimensionality adjustment component applies a convolution to the feature map to reduce the dimensions of the feature map comprising matrices from several channels before combining with the output features from a layer in submodel 752. For example, the dimensionality adjustment component applies a 1-by-1 convolution to reduce the dimensionality of the output feature matrix of a layer or stage in pretrained model 702.

With reference to FIG. 8, this figure depicts a block diagram of an example manner of combining features for input to a submodel layer in accordance with an illustrative embodiment. Artifacts in FIG. 8 bearing the same reference numerals as artifacts in FIG. 7 carry the same meaning as described with respect to FIG. 7.

Detailed view 802 shows an example method of feature combining, to wit, feature map concatenation, to form an input to a layer (SNL) in submodel 752. Suppose that layer Sx is an SL layer in submodel 752 and layer Sy is an SNL layer in submodel 752. Layer Sx outputs feature map Fm. A PL layer in pretrained model 702, with or without dimensionality reduction as the particular implementation may be, contributes feature map Fp. An embodiment combines Fm and Fp by concatenating Fm with Fp (or Fp with Fm, depending on the needs of the particular implementation). Concatenated Fm+Fp becomes the input feature set for layer Sy.

Figure 9:
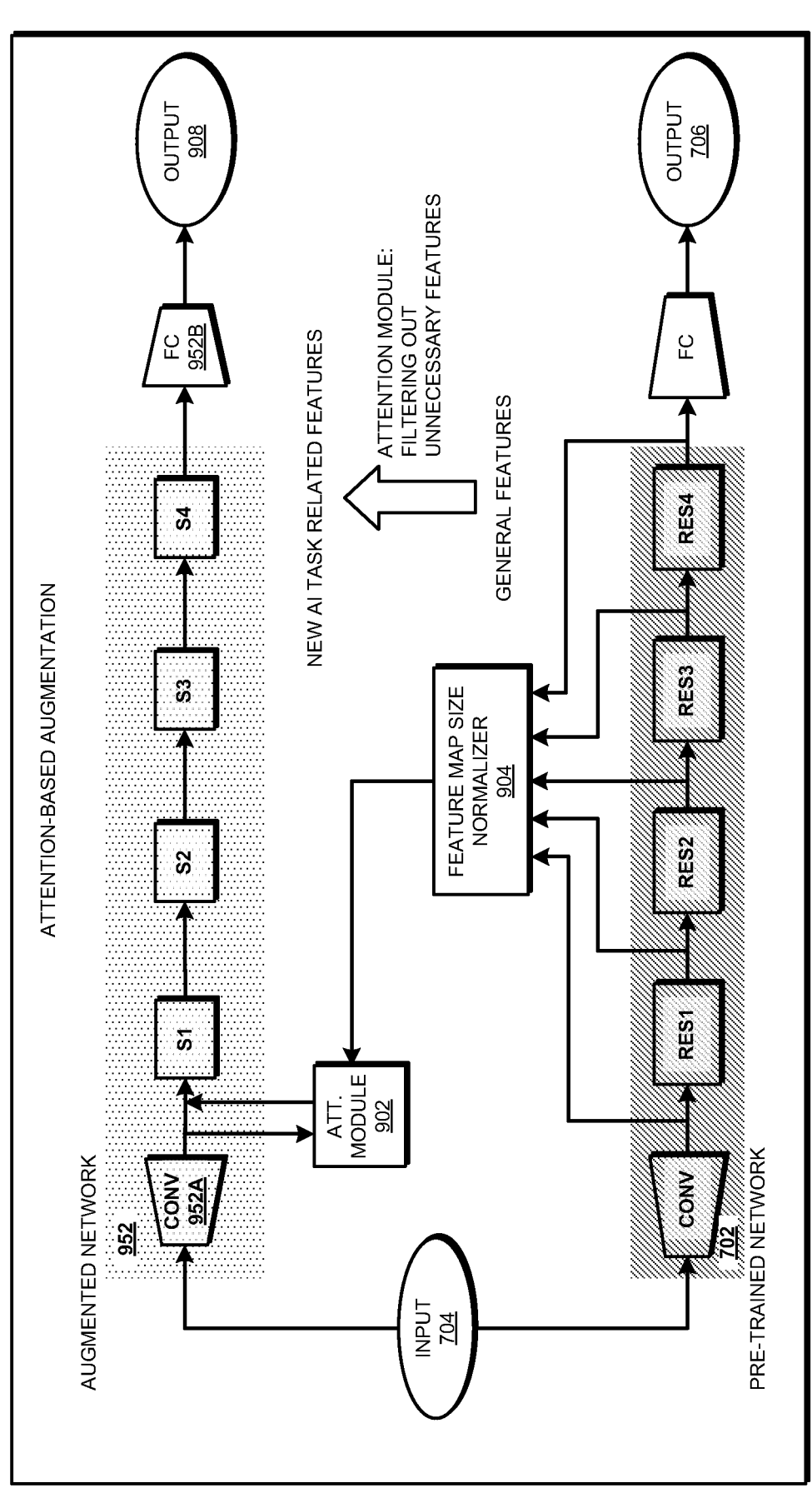
FIG. 9 depicts a block diagram of an attention-based augmentation process in accordance with an illustrative embodiment.

With reference to FIG. 9, this figure depicts a block diagram of an attention-based augmentation process in accordance with an illustrative embodiment. Pretrained model 702 including initial stage 702A and final stage 702B are examples of pretrained model 402, stage 402A, and stage 402B, respectively, in FIG. 6. Submodel 952 including initial stage 952A and final stage 952B are examples of submodel 602, initial convolution stage (not shown), and final stage 602B, respectively, in FIG. 6. Layers Res1, Res2, Res3 . . . Res4 are some example layers (PL) in pretrained model 702. Layers S1, S2, S3 . . . S4 are some example layers (SL and SNL) in submodel 952. Input 704 and output 706 are examples of input 604 and output 606, respectively, as described with respect to FIG. 6. The augmented model formed using attention-based augmentation produces output 908 for the target dataset subject-matter in input 704.

Specifically, module 902 operates in conjunction with submodel 952 to provide the attention-based augmentation functionality. As described earlier, module 902 emphasizes (or de-emphasize) certain channels for more attention or weight as compared to other channels in a particular feature map output from a particular PL. In one embodiment, module 902 is configured to similarly emphasize (or de-emphasize) certain channels for more attention or weight as compared to other channels in a particular feature map output from a particular SL. Based on the emphasized channels from PL, SL, or both, module 902 produces a resulting feature set that serves as an input to the SNL in submodel 952. The emphasis (or de-emphasis) is configurable in an embodiment such that a feature that is not relevant to the subject-matter of the target dataset by at least a threshold degree of relevance is filtered out from reaching the input of the SNL.

Because different PLs can potentially output feature maps of different sizes, a need may exist in a particular implementation to normalize or equalize the feature maps produced from different PLs. Optionally, in one embodiment, module 904 operates to normalize the feature map sizes.

Figure 10:
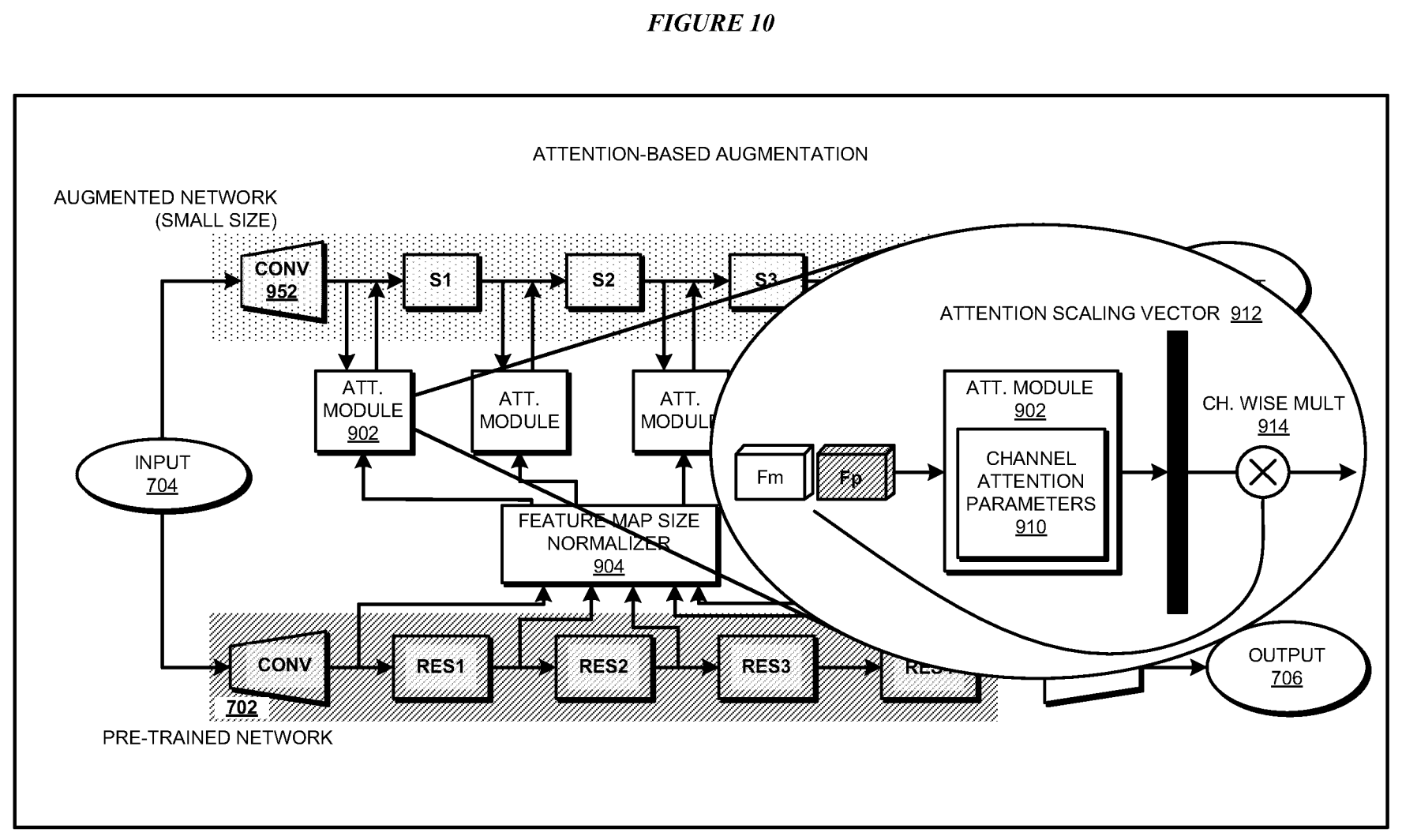

With reference to FIG. 10, this figure depicts a block diagram of an example manner of combining features for input to a submodel layer in accordance with an illustrative embodiment. Artifacts in FIG. 10 bearing the same reference numerals as artifacts in FIG. 9 carry the same meaning as described with respect to FIG. 9.

Detailed view 1002 shows an example method of feature combining, to wit, attention-based augmentation of feature maps, to form an input to a layer (SNL) in submodel 952. Suppose that layer Sx is an SL layer in submodel 952 and layer Sy is an SNL layer in submodel 952. Layer Sx outputs feature map Fm. A PL layer in pretrained model 702 contributes feature map Fp. Module 902 in an embodiment combines Fm and Fp by applying one or more channel attention parameters 1004 to one or more channels in Fm, one or more channels in with Fp, or to one or more channels in Fm and Fp as described earlier. The resulting feature map of features on the emphasized channels forms the input to layer Sy.

One embodiment optionally applies an attention scaling factor 1006 to adjust or normalize a range of the feature values on the emphasized channels. The resulting feature map of features on the scaled and emphasized channels forms the input to layer Sy. Optionally, another embodiment further applies a channel-wise multiplexing 1008 to the multiplexed emphasized scaled channel features to form the input feature map for layer Sy.

With reference to FIG. 11, this figure depicts a block diagram of channel pooling process in accordance with an illustrative embodiment. Pretrained model 702 including initial stage 702A and final stage 702B are examples of pretrained model 402, stage 402A, and stage 402B, respectively, in FIG. 6. Layers Res1, Res2, Res3 . . . Res4 are some example layers (PL) in pretrained model 702. The various layers of pretrained model 702 produce feature maps F0, F1, F2 . . . as described earlier. A submodel (not shown) comprises SL and SNL layers in a manner described herein. An input (not shown) is provided to the augmented model configuration in the manner of input 704 in FIG. 7. Output 706 is an example of output 606 as described with respect to FIG. 6. The augmented model formed using channel pooling produces an output for the target dataset subject-matter in the input.

Specifically, module 1102 operates in conjunction with the submodel to provide the channel pooling functionality. As described earlier, module 1102 selects (or de-selects) certain channels in a particular feature map output from a particular PL. In one embodiment, module 1102 is configured to similarly select (or de-select) certain channels in a particular feature map output from a particular SL. Based on the selected channels from PL, SL, or both, module 1102 produces a resulting feature set that serves as an input 1104 to the SNL in the submodel.

Module 1102 applies one or more channel index selection parameters 1106 to one or more channels, in a manner described herein. Within a channel the feature matrices are also weighted using parameters 1106 to select or deselect certain features according to a weighted channel index 1108. Channel selection parameters 1106 are configurable in an embodiment such that a feature that is not relevant to the subject-matter of the target dataset by at least a threshold degree of relevance is filtered out from reaching the input of the SNL.

With reference to FIG. 12, this figure depicts a block diagram of an example manner of channel pooling in accordance with an illustrative embodiment. Feature map 1202 includes a set of feature matrices from N channels of a PL in pretrained model 702. Feature map 1202 includes channel outputs 1204, 1206, 1208, 1210, 1212, 1214, 1216, 1218, and 1220 such that some channel outputs are weighted differently from other channel outputs for significance in feature map 1202. Different shadings of channel outputs 1204-1220 indicate different weighting.

Suppose that channel outputs 1216, 1204, 1212, and 1210 are weighted more than a threshold weight, and cause those channels to be selected in the order of significance as shown. Channel pooling weights 1222 includes weights for each of the N channels and those weights depend on the significance as determined by the specific submodel. An embodiment applies weights 1222 in a channel-wise multiplexing manner to cause the channels from 1216, 1204, 1212, and 1210 to be rearranged in their order of significance as shown at output 1224. In one embodiment, output 1224 forms the input feature map for an SNL in the submodel.

Optionally, an embodiment performs a batch normalization on the channel outputs of the rearranged channels in output 1224. In one embodiment, batch normalized output 1224 forms the input feature map for an SNL in the submodel. Optionally, another embodiment further applies a rectified linear unit (ReLU) to the batch normalized output. In one embodiment, batch normalized and rectified linearized output 1224 forms the input feature map for an SNL in the submodel.

With reference to FIG. 13, this figure depicts a block diagram of an example application for transfer learning with augmented neural networks in accordance with an illustrative embodiment. Application 1302 can be implemented as application 105 in FIG. 1.

Input 1304 is the new subject-matter training data configured according a new target dataset. Input 1306 is a submodel selected according to the new target dataset. Pretrained model 1308 is selected according to a suitability criterion for the new target dataset, as described earlier.

Component 1310 trains submodel 1306 using training data 1304. Component 1312 augments pretrained model 1308 with the trained submodel produced from component 1310.

Component 1312 includes subcomponents 1314, 1316, and 1318. Subcomponent 1314 performs lateral augmentation as described herein. Subcomponent 1316 performs attention-based augmentation as described herein. Subcomponent 1316 performs channel pooling as described herein. Application 1302 produces output 1320, which is an augmented model that is trained for the new target dataset without having to retrain pretrained model 1308.

Figure 14:
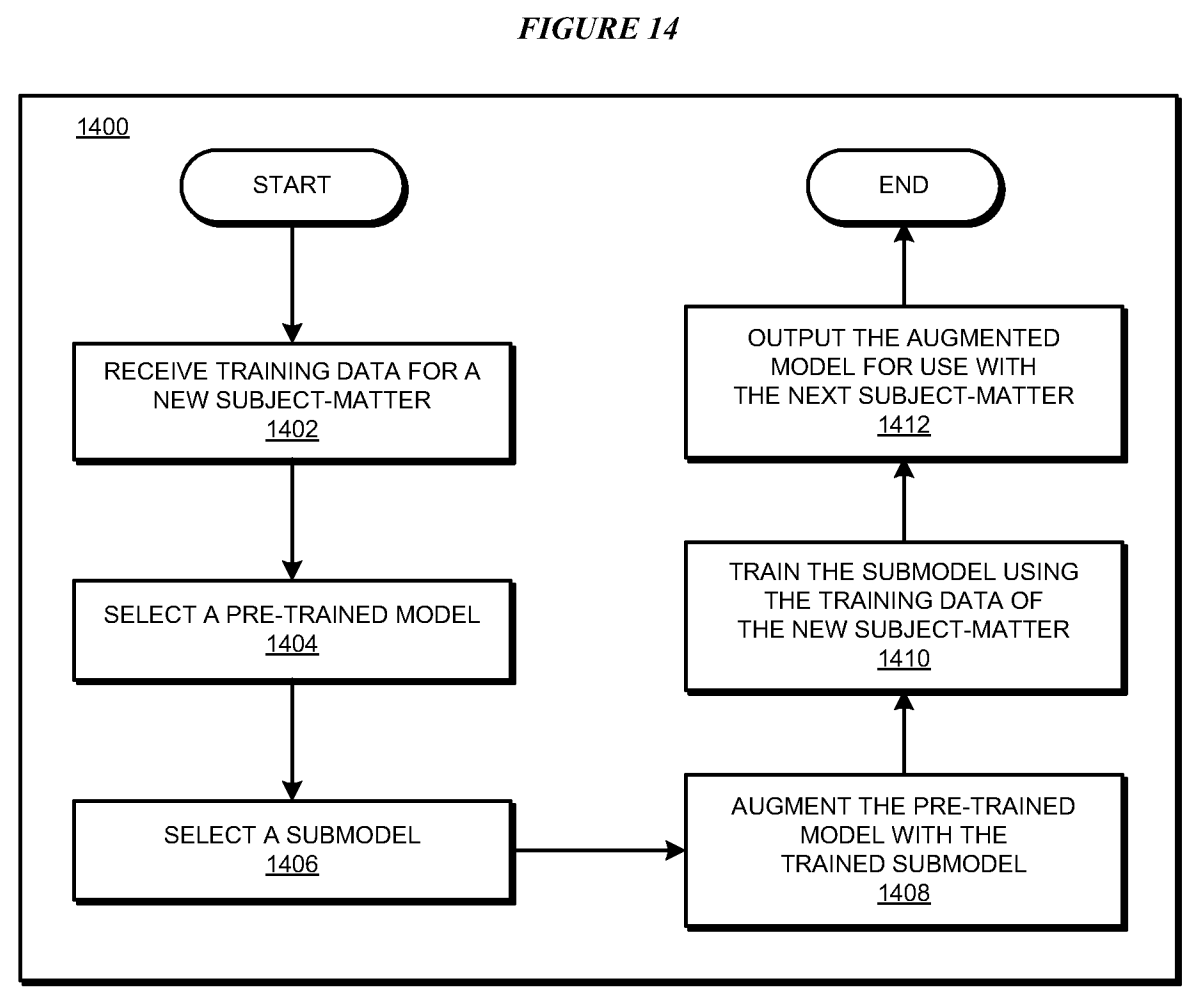

With reference to FIG. 14, this figure depicts a flowchart of an example process for transfer learning with augmented neural networks in accordance with an illustrative embodiment. Process 1400 can be implemented in application 1302 in FIG. 13.

The application receives training data for a new subject-matter (block 1402). The application selects a pretrained model (block 1404). The application selects a submodel (block 1406). The application augments the trained submodel with the pretrained model (block 1408). The application trains the submodel using the training data of block 1402 (block 1410). The application outputs the augmented model for use with the new subject-matter (block 1412). The application ends process 1400 thereafter. Note that in some cases, the submodel may be trained first and then augmented with the pretrained model.

With reference to FIG. 15, this figure depicts a flowchart of an example process for lateral augmentation in accordance with an illustrative embodiment. Process 1500 can be implemented in application 1302 of FIG. 13, for operating as block 1410 in FIG. 14.

The application obtains from a layer in the pretrained model a set of feature matrices corresponding to a number of channels output from that layer (block 1502). The application selects a feature matrix of a channel (block 1504). The application reduces or changes the dimensionality of the feature matrix, e.g., by using a 1-by-1 convolution (block 1506). The application combines the reduced dimension feature matrix with an output feature matrix of a layer in the submodel (block 1508). The application repeats block 1504-1508 for as many matrices as may have to be combined in this manner.

The application inputs the combined feature matrix as an input to another layer in the submodel (block 1510). The application repeats blocks 1502-1510 for as many layer inputs as may need to be created for the submodel. The application ends process 1500 thereafter.

Figure 16:
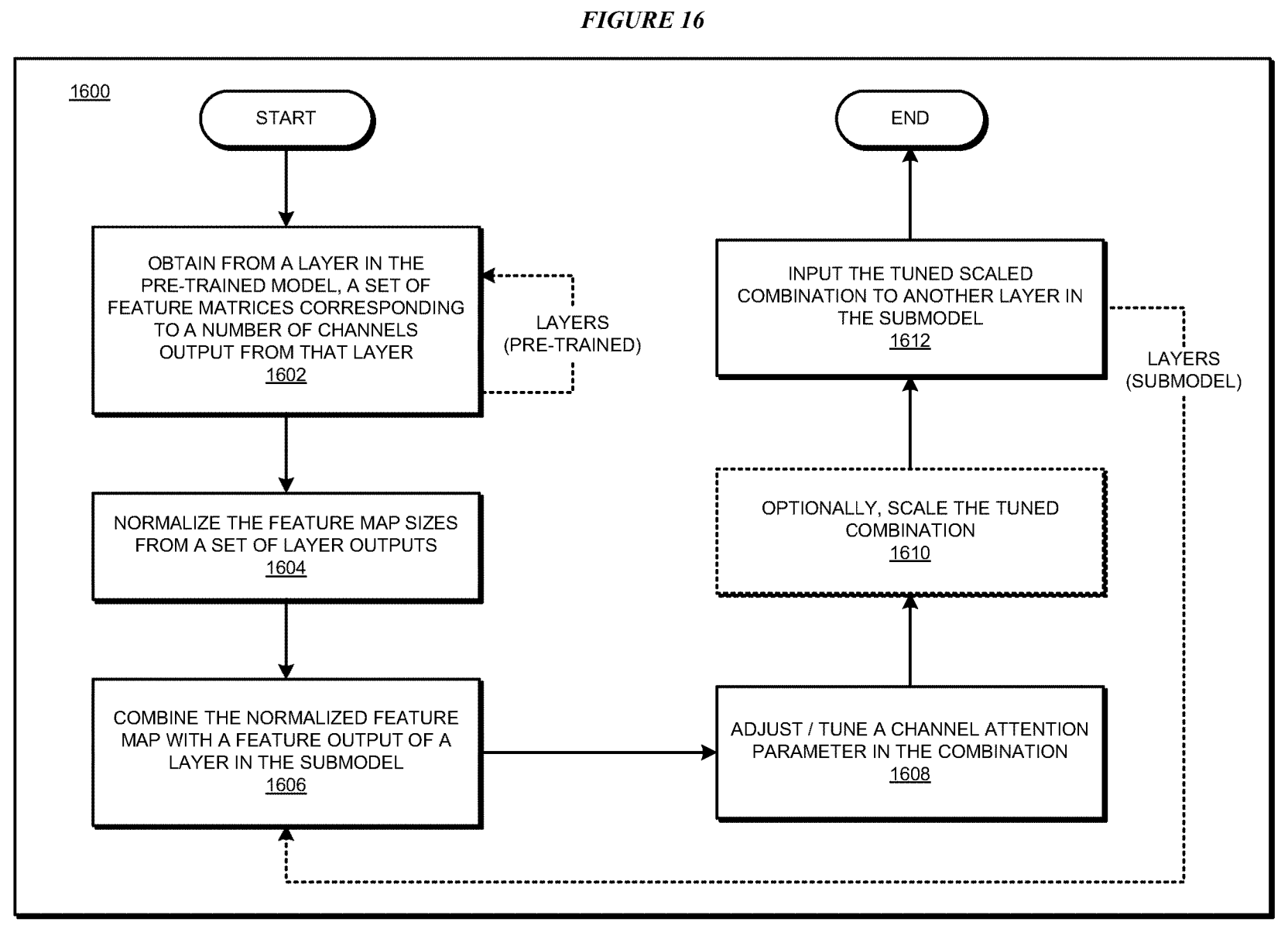

With reference to FIG. 16, this figure depicts a flowchart of an example process for an attention-based augmentation in accordance with an illustrative embodiment. Process 1600 can be implemented in application 1302 of FIG. 13, for operating as block 1410 in FIG. 14.

The application obtains from a layer in the pretrained model a set of feature matrices corresponding to a number of channels output from that layer (block 1602). The application repeats block 1602 for as many layers as may be needed in an implementation from which the outputs may have to be collected.

The application normalizes the feature map sizes from a set of layer outputs (block 1604). The application combines the normalized feature map with a feature output of a layer in the submodel (block 1606). The application adjusts or tunes a channel attention parameter in the combination (block 1608). The application optionally scales the tuned combination (block 1610). The application inputs the tuned scaled combination to another layer in the submodel (block 1612). The application repeats blocks 1606-1612 for as many layers in the submodel as may need the tuned scaled combination as input. The application ends process 1600 thereafter.

Figure 17:
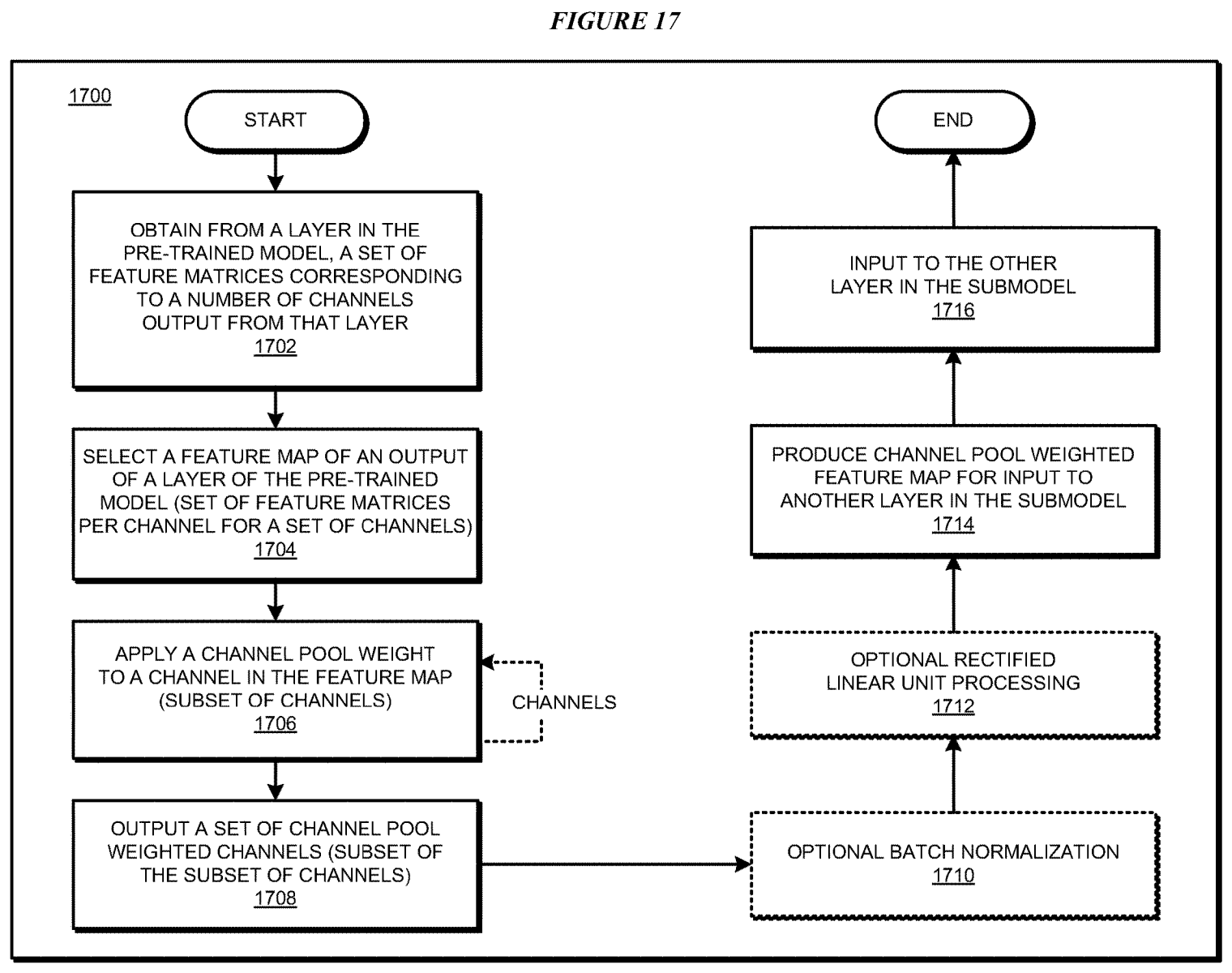

With reference to FIG. 17, this figure depicts a flowchart of an example process for channel pooling in accordance with an illustrative embodiment. Process 1700 can be implemented in application 1302 of FIG. 13, for operating as block 1410 in FIG. 14.

The application obtains from a layer in the pretrained model a set of feature matrices corresponding to a number of channels output from that layer (block 1702). The application selects a feature matrix of an output channel of a layer in the pretrained model (block 1704). The application applies a channel pool weight to the feature matrix of a channel in the feature map (block 1706). The application repeats block 1706 for as many channels as may need to be weighted in this manner.

The application outputs a subset of channels as a set of channel pool weighted channels (block 1708). The application optionally performs batch normalization (block 1710) and further optionally applies rectified linear unit processing to the channel pool weighted channels (block 1712). The application produces an input feature map comprising the channel pool weighted channels for another layer in the submodel (block 1714). The application inputs the input feature map to the other layer (block 1716). The application ends process 1700 thereafter.

Thus, a computer implemented method, system or apparatus, and computer program product are provided in the illustrative embodiments for transfer learning with augmented neural networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising:

selecting a pretrained neural network model to operate in an augmented neural network model configuration with a neural network submodel, wherein the pretrained neural network model is pretrained to classify a first type of object in a first domain;

training, using a processor and a memory, the neural network submodel using training data corresponding to a second domain, wherein the training comprises training the neural network submodel to classify a second type of object in the second domain; and augmenting, to form the augmented neural network model configuration, the pretrained neural network model with the neural network submodel, the augmenting comprising:

rearranging a subset of channels from an output of a layer in the pretrained neural network model, the subset including those channels whose channel selection parameters cause those channels to have a greater than a threshold weight, the rearranging further applying a first weight vector to the subset of channels according to a relevance criterion, the subset including the first channel as a highest weighted channel;

combining, to form a combined feature map, a first feature map being output from a layer in the pretrained neural network model with a second feature map being output from a layer in the neural network submodel; and inputting the combined feature map into a different layer in the neural network submodel.

2. The method of claim 1, further comprising:

concatenating, as a part of the combining, the first feature map and the second feature map.

3. The method of claim 1, further comprising:

adjusting a dimensionality of an original feature map, the original feature map being an original output from the layer in the pretrained neural network model, the adjusting resulting in the first feature map used in the combining.

4. The method of claim 3, wherein the adjusting comprises reducing the dimensionality of the original feature map.

5. The method of claim 4, wherein the reducing comprises applying a 1-by-1 convolution to the original feature map.

6. The method of claim 1, wherein the neural network submodel is smaller than the pretrained neural network model according to at least one factor selected from a set of factors comprising (i) a total number of nodes in the neural network submodel and (ii) a total number of layers in the neural network submodel.

7. The method of claim 1, wherein the neural network submodel is smaller than the pretrained neural network model according to a total number of model parameters.

8. A method comprising:

selecting a pretrained neural network model to operate in an augmented model configuration with a neural network submodel, wherein the pretrained neural network model is pretrained to classify a first type of object in a first domain;

training, using a processor and a memory, the neural network submodel using training data corresponding to a second domain, wherein the training comprises training the neural network submodel to classify a second type of object in the second domain; and augmenting, to form the augmented model configuration, the pretrained neural network model with the neural network submodel, the augmenting comprising:

rearranging a subset of channels from an output of a layer in the pretrained neural network model, the subset including those channels whose channel selection parameters cause those channels to have a greater than a threshold weight, the rearranging further applying a first weight vector to the subset of channels according to a relevance criterion, the subset including the first channel as a highest weighted channel;

adjusting an attention value of a channel in a first feature map being output from a layer in the pretrained neural network model, wherein the adjusting causes a first feature matrix of the channel in the first feature map to have a greater weight relative to a second feature matrix of a different channel in the first feature map;

combining, to form a combined feature map, a first feature matrix of the channel in the first feature map with a second feature map being output from a layer in the neural network submodel; and inputting the combined feature map into a different layer in the neural network submodel.

9. The method of claim 8, further comprising:

adjusting a second attention value of a second channel in a second feature map being output from a layer in the neural network submodel, wherein the adjusting the second attention value causes a first feature matrix of the second channel in the second feature map to have a greater weight relative to a second feature matrix of a second different channel in the second feature map, and wherein the combining combines the first feature matrix of the second channel in the second feature map with the first feature matrix of the channel in the first feature map.

10. The method of claim 8, further comprising:

applying a scaling factor to a plurality of weighted feature matrices from at least one of the first feature map and the second feature map.

11. The method of claim 8, further comprising:

applying a channel-wise multiplexing to the combined feature map prior to inputting the combined feature map.

12. The method of claim 8, wherein the neural network submodel is smaller than the pretrained neural network model according to at least one factor selected from a set of factors comprising (i) a total number of nodes in the neural network submodel and (ii) a total number of layers in the neural network submodel.

13. The method of claim 8, wherein the neural network submodel is smaller than the pretrained neural network model according to a total number of model parameters.

14. A method comprising:

selecting a pretrained model to operate in an augmented model configuration with a submodel, wherein the pretrained model is pretrained to classify a first type of object in a first domain;

training, using a processor and a memory, the submodel using training data corresponding to a second domain, wherein the training comprises training the submodel to classify a second type of object in the second domain; and augmenting, to form the augmented model configuration, the pretrained model with the submodel, the augmenting comprising:

applying a channel selection parameter to a first channel in a first feature map being output from a layer in the pretrained model, wherein the applying causes a first feature matrix of the first channel in the first feature map to have a greater weight relative to a second feature matrix of a different channel in the first feature map;

rearranging a subset of channels from the output of the layer in the pretrained model, the subset including those channels whose channel selection parameters cause those channels to have a greater than a threshold weight, the rearranging further applying a first weight vector to the subset of channels according to a relevance criterion, the subset including the first channel as a highest weighted channel;

combining, to form a combined feature map, a first feature matrix of the first channel in the first feature map with a second feature map being output from a layer in the submodel; and inputting the combined feature map into a different layer in the submodel.

15. The method of claim 14, further comprising:

applying a second channel selection parameter to a second channel in the second feature map, wherein the applying the second channel selection parameter causes a second feature matrix of the second channel in the second feature map to have a greater weight relative to a third feature matrix of a different channel in the second feature map;

rearranging a second subset of channels from the output of the layer in the submodel, the second subset including those channels whose channel selection parameters cause those channels to have a greater than the threshold weight, the rearranging further applying a second weight vector to the second subset of channels according to the relevance criterion, the second subset including the second channel as a highest weighted channel, and wherein the combining to form the combined feature map combines a first feature matrix of the first channel in the subset of channels with a second feature map from the second channel in the second subset.

16. The method of claim 14, further comprising:

applying a batch normalization to a plurality of feature matrices in the combined feature map prior to the inputting.

17. The method of claim 14, further comprising:

applying a channel-wise multiplexing to the combined feature map prior to inputting the combined feature map.

18. The method of claim 14, further comprising:

applying a rectified linear unit computation to the combined feature map prior to inputting the combined feature map.

19. The method of claim 14, wherein the submodel is smaller than the pretrained model according to at least one factor selected from a set of factors comprising (i) a total number of nodes in the submodel and (ii) a total number of layers in the submodel.

20. The method of claim 14, wherein the submodel is smaller than the pretrained model according to a total number of model parameters.

* * * * *